(12) United States Patent
Furusawa

(10) Patent No.: US 11,384,495 B2
(45) Date of Patent: Jul. 12, 2022

(54) METHOD FOR GUIDING UNDERWATER ORGANISMS, AND SYSTEM FOR GUIDING UNDERWATER ORGANISMS

(71) Applicant: Yosuke Furusawa, Takizawa (JP)

(72) Inventor: Yosuke Furusawa, Takizawa (JP)

(*) Notice: Subject to any disclaimer, the term of this patent is extended or adjusted under 35 U.S.C. 154(b) by 550 days.

(21) Appl. No.: 16/308,374

(22) PCT Filed: Jun. 8, 2017

(86) PCT No.: PCT/JP2017/021360
§ 371 (c)(1),
(2) Date: Dec. 7, 2018

(87) PCT Pub. No.: WO2017/213233
PCT Pub. Date: Dec. 14, 2017

(65) Prior Publication Data
US 2019/0264406 A1 Aug. 29, 2019

(30) Foreign Application Priority Data

Jun. 10, 2016 (JP) .............................. JP2016-128131
Aug. 26, 2016 (JP) .............................. JP2016-166353
Oct. 24, 2016 (JP) .............................. JP2016-207470

(51) Int. Cl.
*E02B 1/00* (2006.01)
*A01K 61/10* (2017.01)
(Continued)

(52) U.S. Cl.
CPC .............. *E02B 1/006* (2013.01); *A01K 61/10* (2017.01); *A01K 63/00* (2013.01); *A01K 79/00* (2013.01); *A01K 79/02* (2013.01); *Y02A 40/81* (2018.01)

(58) Field of Classification Search
USPC ................. 119/220, 291, 201, 908; 43/17.1; 340/852; 307/106
See application file for complete search history.

(56) References Cited

U.S. PATENT DOCUMENTS 1,292,246 A * 1/1919 Burkey ................. A01K 79/02
119/220
1,974,444 A * 9/1934 Burkey ................. A01K 63/00
119/220
(Continued)

FOREIGN PATENT DOCUMENTS

JP    49-011695 A  *  2/1974
JP    S49-011695 A     2/1974
(Continued)

OTHER PUBLICATIONS

International Search Report for International Application No. PCT/JP2017/021360 dated Sep. 5, 2017, 9 pages.
(Continued)

*Primary Examiner* — Andrea M Valenti

(57) ABSTRACT

Disclosed is a method for guiding aquatic organisms. The method includes disposing a plurality of electrode units at a distance from one another in water; and applying an electrical pulse to at least one electrode unit of the plurality of electrode units to generate an electric field and/or a magnetic field around the at least one electrode unit to guide the aquatic organisms by stimulating the aquatic organisms with the generated electric and/or magnetic fields.

6 Claims, 15 Drawing Sheets

(51) Int. Cl.
*A01K 79/02* (2006.01)
*A01K 63/00* (2017.01)
*A01K 79/00* (2006.01)

(56) References Cited

U.S. PATENT DOCUMENTS

| | | | | |
|---|---|---|---|---|
| 2,233,045 A * | 2/1941 | Miller | H05C 1/04 | 119/220 |
| 2,778,140 A * | 1/1957 | Applegate | A01K 79/02 | 43/17.1 |
| 2,808,674 A * | 10/1957 | Vang | A01K 79/00 | 43/17.1 |
| 2,913,846 A * | 11/1959 | McLain | A01K 69/06 | 43/17.1 |
| 2,991,421 A * | 7/1961 | Charles | H05C 1/02 | 327/465 |
| 3,491,474 A * | 1/1970 | Metcalf, Jr. | A01K 79/02 | 43/9.6 |
| 3,714,729 A * | 2/1973 | Moise | A01K 79/02 | 43/4.5 |
| 4,750,451 A * | 6/1988 | Smith | A01K 79/02 | 119/220 |
| 4,825,810 A * | 5/1989 | Sharber | A01K 79/02 | 119/220 |
| 5,327,854 A * | 7/1994 | Smith | A01K 79/02 | 119/220 |
| 5,445,111 A * | 8/1995 | Smith | A01K 79/02 | 119/220 |
| 6,134,824 A * | 10/2000 | Gleeson | A01K 79/02 | 43/17.1 |
| 6,917,294 B2 * | 7/2005 | Larsen | A01K 75/00 | 340/573.2 |
| 6,978,734 B1 * | 12/2005 | Smith | A01K 79/02 | 119/220 |
| 7,975,425 B1 * | 7/2011 | VanBurch | A01K 79/02 | 43/17.1 |
| 9,596,836 B2 * | 3/2017 | Carstensen | E02B 1/006 | |
| 2006/0102087 A1 * | 5/2006 | Page | A01K 61/60 | 119/223 |
| 2010/0116216 A1 * | 5/2010 | Fuhr | A01K 61/10 | 119/221 |
| 2010/0224134 A1 * | 9/2010 | Burger | A01K 61/00 | 119/220 |
| 2014/0238307 A1 * | 8/2014 | Weibel | H05C 1/04 | 119/220 |
| 2015/0201590 A1 | 7/2015 | Carstensen et al. | | |

FOREIGN PATENT DOCUMENTS

| | | |
|---|---|---|
| JP | S49-041185 A | 4/1974 |
| JP | H05-123079 A | 5/1993 |
| JP | H06-153744 A | 6/1994 |
| JP | H09-279553 A | 10/1997 |
| WO | WO 2007/058554 A1 | 5/2007 |
| WO | WO 2010/138009 A2 | 12/2010 |

OTHER PUBLICATIONS

Extended European Search Report dated Dec. 12, 2019, in EP Application No. 17810406.3, 8 pages.

\* cited by examiner

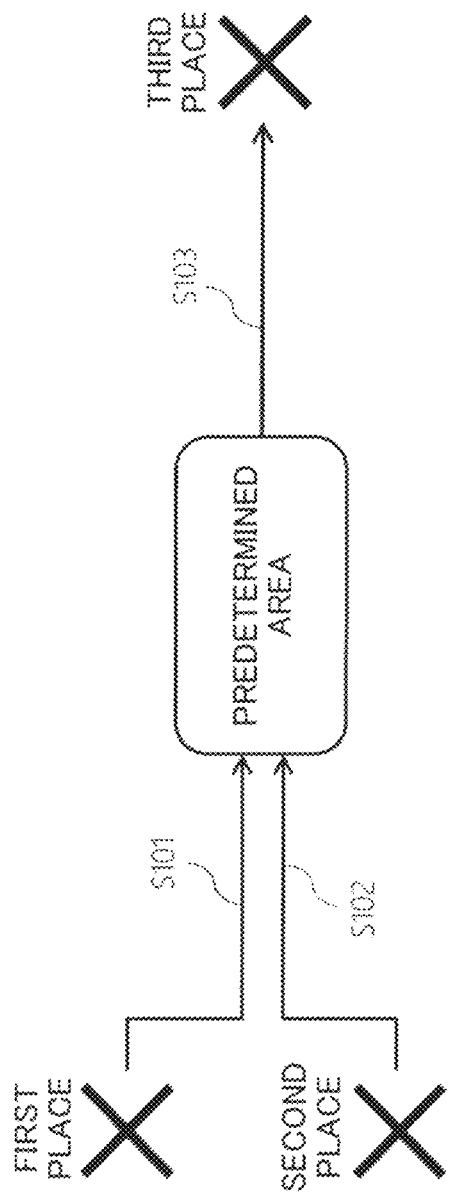

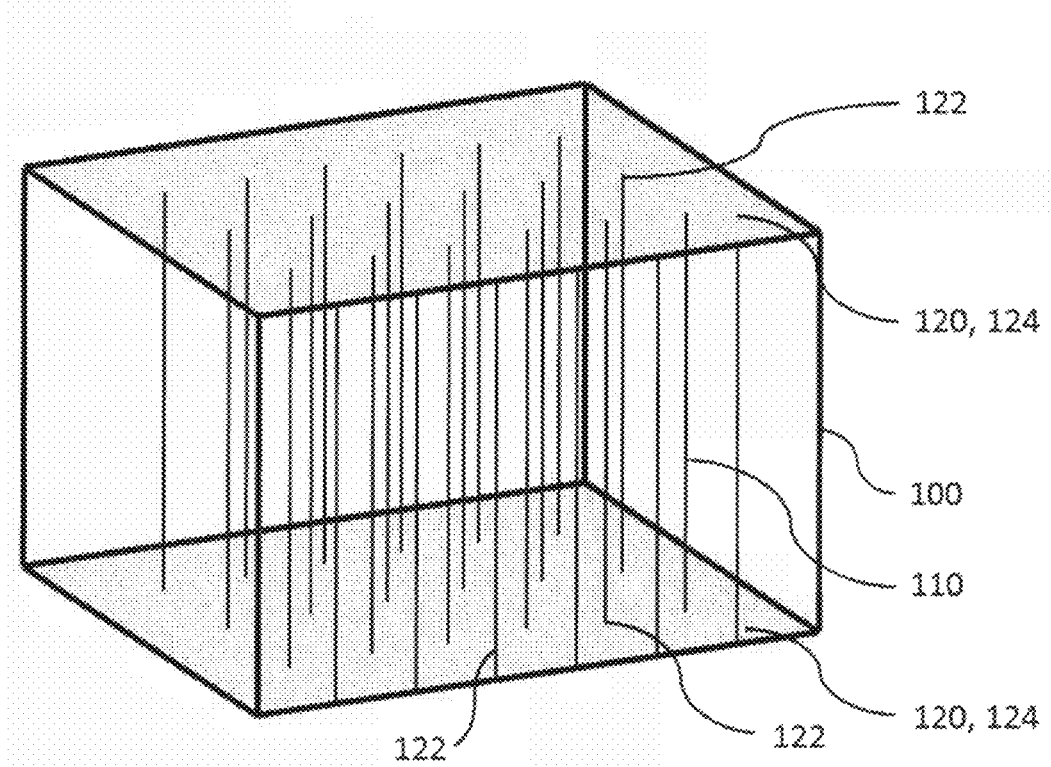

METHOD FOR GUIDING UNDERWATER ORGANISMS, AND SYSTEM FOR GUIDING UNDERWATER ORGANISMS

RELATED APPLICATIONS AND FOREIGN PRIORITY CLAIM

This application is a 35 U.S.C. § 371 national stage application, which claims priority to International PCT Application No. PCT/JP2017/021360, which claims priority to Japanese Patent Application Nos. 2016-128131, filed on Jun. 10, 2016; 2016-166353, filed on Aug. 26, 2016; and 2016-207470, filed on Oct. 24, 2016, each of which is incorporated by reference herein in their entirety.

TECHNICAL FIELD

The present invention relates to a method for guiding aquatic organisms and a system for guiding aquatic organisms.

BACKGROUND ART

Enclosure culture systems, specifically so called cage and pen culture systems are, at present, one of the most widely used aquaculture systems for rearing aquatic organisms, especially for fish farming. Such enclosure culture systems typically include a process of installing an aquaculture nursery by placing a dosed compartment called "a fish preserve" surrounded by a net in water, such as sea, lake, or water tank; rearing fish in the fish preserve; capturing the fish reared to a stage sufficient for shipment; and shipping the fish.

In such an entire process of fish farming, a person frequently needs to go to a fish preserve via ship to work at that location. For example, a person frequently may need to go to a fish preserve via ship to work at that location when feeding the fish, maintaining the net, putting the fish in the fish preserve for the first time, and finally capturing the fish.

In order to improve working efficiency of fish farming in such a fish farm, a net configured to prevent deposits is proposed for improving maintenance of a net, among the above-mentioned processes (Patent Document 1).

Likewise, in order to omit the maintenance of a net itself entirely, a method for installing an electric fence in the sea is proposed (Patent Document 2).

RELATED ART DOCUMENTS

Patent Documents

[Patent Document 1] Japanese Unexamined Patent Application Publication No. 6-153744
[Patent Document 2] Japanese Unexamined Patent Application Publication No. 5-123079

SUMMARY OF THE INVENTION

Problem to be Solved by the Invention

To take various measures with respect to a net in aquaculture appears to exhibit a certain effect in improving the maintainability of a net; however those measures will not be effective with respect to any other work. Further, even if an electric fence is used instead of a net, an electric fence does not seem to exert more effect than the effect brought by the net, that is, with an electric fence, fish will simply not go through the electric fence to swim toward the opposite area. That is, it appears impossible to guide the aquatic organisms toward a desired direction/position by causing the aquatic organisms to voluntarily move and swim toward their desired direction.

There is a suitable rearing environment for each type of aquatic organisms such as fish, according to various natural conditions such as water temperature, water quality, and the like. One of the most important factors in increasing the productivity in the aquaculture nursery is to select a location well-suited with natural conditions according to the type of aquatic organisms when setting up a fish farm, especially, setting up a fish preserve in which the aquatic organisms move without restriction.

However, when actually setting up a fish farm, it may be difficult to select a fish farm based on natural conditions alone, in consideration of a condition where a person needs to go to a fish preserve via ship to work on the spot, and an additional condition of being accessible by ship needs to be added. Thus, in practice, it is inevitable to select a location for setting the fish preserve with more favorable natural conditions from within a range of areas with certain accessibility.

Further, operations that require a person to actually go to a fish preserve to work at that location, such as giving food and medicine to aquatic organisms being cultured or capturing them for shipping, are hard work and dangerous, because going to a fish preserve by ship itself is accompanied by a certain level of risks. Thus, going to a fish preserve by ship itself is a cause of making productivity improvement difficult.

Furthermore, even if there is work that needs to be performed according to the growth condition of aquatic organisms being cultured, the temperature of water, the timing, and the like, a ship will not be dispatched due to the weather; thus the optimal timing of the work may be missed. Missing the timing as described above has an unfavorable effect on the growth of aquatic organisms, which has resulted in a factor that hinders the improvement of productivity.

In view of such a problem, methods and systems for cultivating aquatic organisms capable of automating manual work on aquaculture of aquatic organisms have been desired so as to reduce the necessity of access by ship to a fish farm, thereby improving the productivity.

In rearing aquatic organisms in a water tank in addition to rearing aquatic organisms in the sea, lake, river, and the like, the following related art methods have been conducted. Such related art methods include a method of dividing the inside of one water tank by a net to form a plurality of areas, and classifying the areas according to growth of fish to rear the fish in the classified area; and a method of dispersing fish schooling densely inside the water tank by water flow to bring sufficient oxygen to the fish has been conducted. Further, a net needs to be used to put the fish in the tank or to take out the fish from the tank. In such a case, there is an increasing demand for a method and the like capable of moving aquatic organisms without directly touching aquatic organisms so as not to damage the aquatic organisms.

Thus, it is an object of the present invention to provide a method and a system for moving and guiding aquatic organisms in a desired direction by restricting their movement in an undesired direction without directly touching the aquatic organisms reared in water, as well as providing an electrode device for use in such a method and system. Further, it is another object of the present invention to provide a method and a system capable of applying such technology to automate manual work relating to aquaculture of aquatic organisms to improve productivity, as well as providing an electrode device for use in such a method and system.

Means for Solving the Problem

In order to solve the above problem, a method according to an embodiment of the present invention includes:
disposing a plurality of electrode units at a distance from one another in water, and
applying an electrical pulse to at least one electrode unit of the plurality of electrode units to generate an electric field and/or a magnetic field around the at least one electrode unit to guide the aquatic organisms by stimulating the aquatic organisms with the generated electric and/or magnetic fields.

In addition, a system according to an embodiment of the present invention includes:
a plurality of electrode units installed in water; and
a controller configured to control application of an electric pulse to at least one electrode unit of the plurality of electrode units, wherein
the controller generates an electric field and/or a magnetic field around the at least one electrode unit to guide the aquatic organisms by stimulating the aquatic organisms with the electric and/or magnetic fields.

That is, aquatic organisms surrounding an electrode to which the electric pulse is applied are affected by the electric and/or magnetic fields generated around the electrode, feel stimulation, and move voluntarily away from the electrode. Thus, it is possible to direct the aquatic organism to voluntarily move in an opposite direction, that is, in a direction in which a user or the like desires to guide aquatic organisms, by applying an electric pulse to an electrode disposed in a direction in which the user or the like desires to prevent the aquatic organisms from moving.

In another embodiment of the invention,
the aquatic organisms may be guided by restricting a moving direction of the aquatic organisms by stimulating the aquatic organisms with the electric field and/or the magnetic field to allow the aquatic organisms to stay in a desired area and/or to move in a desired direction.

In still another embodiment of the invention,
the electric pulse may be applied such that a stimulus to the aquatic organisms applied by the electric field and/or the magnetic field decreases toward a direction in which the aquatic organisms are to be guided.

That is, a stimulus applied to aquatic organisms gradually decreases as the aquatic organisms travel more toward a direction in which the aquatic organisms are to be guided, and intensity of the stimulus received by the aquatic organisms gradually increases as the aquatic organisms travel toward a direction differing from the direction in which the aquatic organisms are to be guided. Accordingly, the aquatic organisms attempting to travel in a direction differing from the direction in which the aquatic organisms are to be guided, and fish located farther from the direction in which the aquatic organisms are to be guided will receive a stronger stimulus. As a result, such aquatic organisms or fish will escape toward weak stimulation, and move voluntarily in a direction in which the aquatic organisms are desired to be guided. Thus, it is possible to guide the aquatic organisms in this manner.

In yet another embodiment of the present invention, an electrode device for use in the above-described method, or an electrode device included in the system described above, may include:
an electrode unit to which an electric pulse is applied;
a fixing unit configured to fix the electrode unit in water, wherein
an electric field and/or a magnetic field for guiding aquatic organisms is formed in water when the electric pulse is applied.

In this electrode device, the electrode unit may include a linear portion having an at least partially conductive and corrosion resistant surface, and the linear portion may include a flexible pipe or wire.

In still another embodiment of the invention, the electrode device may further include
a locating unit for disposing a plurality of electrode units in a water tank, wherein
the locating unit may have a plate-like member provided with locating holes into which end portions of the electrode units are inserted. In addition, the electrode units may be disposed on an inner wall surface and/or inside the inner wall of the water tank.

Advantageous Effect of the Invention

According to the embodiments of the present invention described above,
electric and/or magnetic fields may be formed in water by applying an electric pulse to the electrode unit to stimulate aquatic organisms via the electric field and/or magnetic field to urge the aquatic organisms to escape from this stimulus. As a result, it is possible to guide the aquatic organisms in a desired direction. As described above, it is possible to remarkably reduce the frequency of a person reaching by ship a place where fish are present and performing work thereat, by guiding fish by a stimulus applied with an electric field and/or a magnetic field, which is formed by the application of the electric pulse. Hence, it is possible to dramatically reduce the labor and cost of manual work involved in fish farming, which in turn may remarkably improve the productivity of aquaculture.

In addition, the fish are guided by the electric field and/or the magnetic field formed by the electric pulse; thus, it is possible to prevent the cultured fish from being damaged because there is no need of directly touching the fish such as a case of using a net when guiding the fish. As a result, it is possible to improve the quality of the shipped aquaculture fish, thereby improving productivity from the viewpoint of quality.

Furthermore, a barrier or the like formed by the electric and/or magnetic fields formed by the electrical pulse differs from a traditional net fence and is thus not a mesh-like obstacle; hence, it is possible to guide the fish by preventing the movement of the fish attempting to pass through an area where the electric and/or magnetic fields are formed irrespective of the size of fish.

BRIEF DESCRIPTION OF DRAWINGS

FIG. 14 is a diagram illustrating a procedure of a method according to an embodiment of the present invention; and FIG. 15 is a diagram illustrating a water tank to which an embodiment of the present invention is applied.

MODE OF CARRYING OUT THE INVENTION

Figure 1:
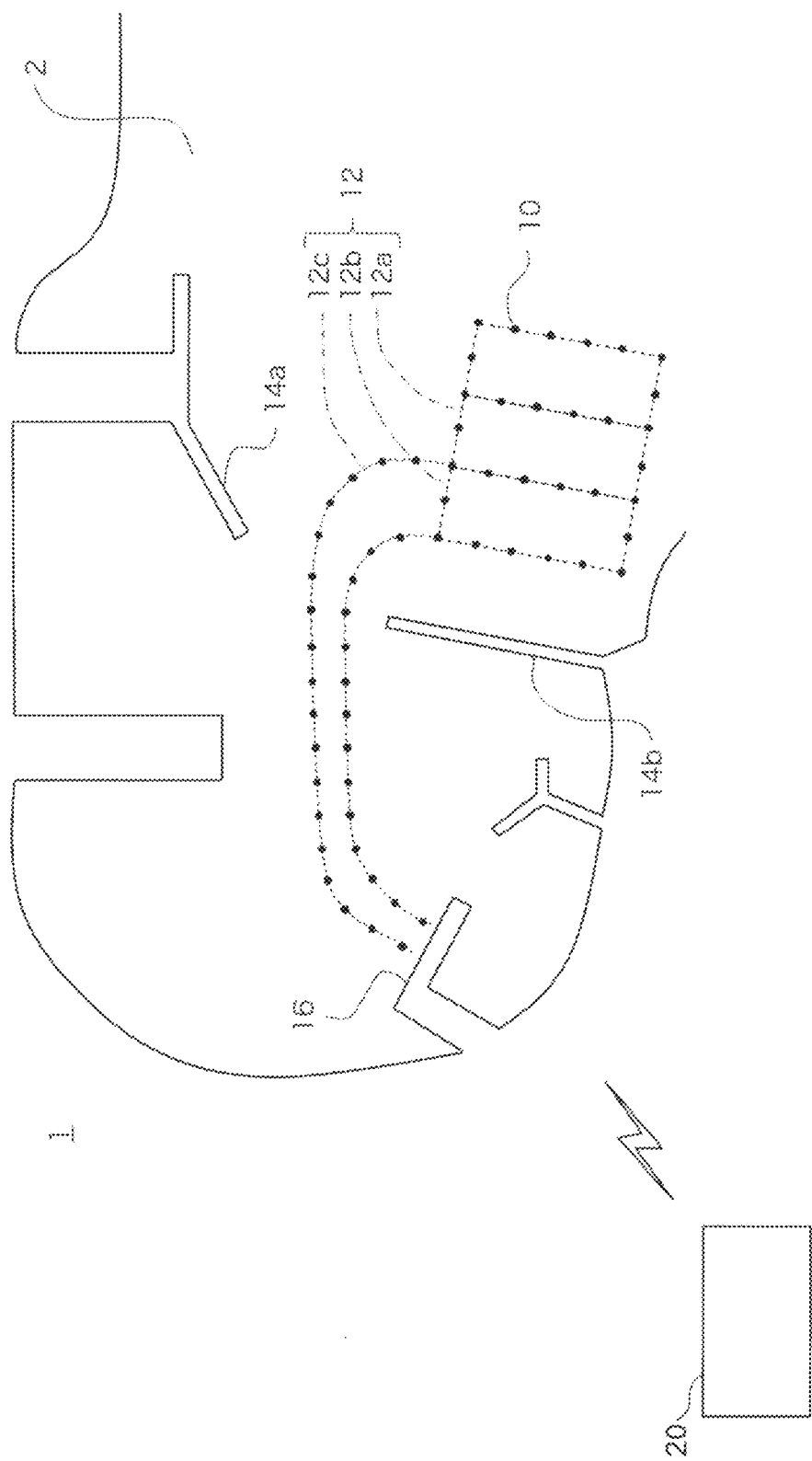
FIG. 1 is a schematic diagram illustrating a system according to an embodiment of the present invention.

Embodiments of the present invention will be described in detail below with reference to the accompanying drawings. In the following embodiments, a description will be given by taking fish as an example of aquatic organisms. In the drawings, the same or similar components will be denoted by the same reference numerals, so as to omit duplicated descriptions.

FIG. 1 is a schematic diagram illustrating a system, specifically, a fish farming system according to an embodiment of the present invention. FIG. 1 depicts an example in which a fish farming system 1 is provided in the sea 2. The fish farming system 1 includes a plurality of electrode units 10 installed in water, and a controller 20 configured to control electric pulses applied to each of the electrode units 10. Fish are guided by an electric field formed by the electric pulses in an area 12 enclosed by the plurality of electrode units 10. In the example depicted in FIG. 1, each of the electrode units 10 communicates with the controller 20 via radio; however, each of the electrode units 10 may be electrically connected with the controller 20 via wired connection. Further, power may be supplied to each of the electrode units 10 and/or to the controller 20 from a battery module provided in the electrode units 10 as described later, or power may be supplied to each of the electrode units 10 and/or to the controller 20 from an external power supply via connection in a wired/wireless or non-contact manner. The controller 20 is configured to select an electrode unit to which an electrical pulse is to be applied, to set a parameter of the electrical pulse to be applied, to control the timing of the electrical pulse to be applied, and to control or manage other attached sensors and devices, and the like. The controller 20 may further be configured to include a memory that stores various parameters of the electrical pulse, information on characteristics of fish to be guided, and data on natural conditions such as water quality and weather. Further, the controller 20 may be provided as one controller for the system 1, or two or more controllers 20 may be provided in a distributed manner for respective electrode units, for example.

In FIG. 1, the plurality of electrode units 10 are arranged at intervals from one another on an outer side and an inner side of a bay separated by banks 14a and 14b. The area 12 enclosed by the plurality of electrode units 10 includes a fish preserve area 12a, and a guide path area 12c communicating with the fish preserve area 12a via an entrance/exit area 12b, for extending from the fish preserve area 12a to a port 16c. Note that in the example depicted FIG. 1, the electrode units 10 are arranged mainly along an outline of each of the above-mentioned fish preserve area 12a, the entrance/exit area 12b, and the guide path area 12c; however, the electrode units 10 may be arranged in a matrix in an area that may include the fish preserve area 12a, the entrance/exit area 12b, and the guide path area 12c. In such a case, the electrode units disposed at positions where a fish preserve area, an entrance/exit area, and/or a guide path area are to be formed are selected from among the electrode units arranged in a matrix, and electrode pulses are applied to the selected electrode units; as a result, a fish preserve area, an entrance/exit area, and/or a guide path area are formed in a desired area. According to such an embodiment, it is possible to change the positions of the fish preserve area, entrance/exit area, and guidance path area, according to various conditions such as season, temperature of water, state of water flow, distribution state of bait, and the like. Hence, it is possible to guide fish to the most suited area at that time, similar to nomadic sheep grazing.

An electric field is generated in water by applying electric pulses to a plurality of electrode units 10 arranged at intervals in water, thereby causing the generated electric field to guide the fish.

When an electric field is generated in water by applying electric pulses to the electrode units 10, electrical stimuli are applied to fish in an area where the electric field is generated. It is possible to give a stimulus of a type disliked by the fish to be guided, in particular, by adjusting the intensity, the cycle, the frequency, and the like of the electric pulses. In other words, it is possible to apply electric pulses to the electrode units to generate an electric field that applies electrical stimuli disliked by the fish to create an area where the fish will not come close to the electrode units, thereby forming a barrier by the generated electric field.

By applying electric pulses to the electrode units 10, intensity of the electric field formed in water increases as the distance from the electrode units 10 decreases, and intensity of the electric field formed in water decreases as the distance from the electrode units 10 increases. Furthermore, as the strength of the electric field increases, the intensity of the stimuli felt by the fish also increases. Therefore, when an electric pulse is applied to a certain electrode unit 10, the fish closer to that electrode unit 10 will receive greater stimuli. Accordingly, when an electric pulse is applied to a certain electrode unit 10, the fish themselves voluntarily move away from that electrode unit 10 in an attempt to escape in a direction toward weak stimuli, thereby making it possible to guide the fish.

An electrode unit, to which an electric pulse is to be applied, is appropriately selected from among a plurality of electrode units according to a position of each electrode unit, and a parameter of the electrical pulse applied to the electrode unit is appropriately selected; as a result, a barrier/an area where fish will not enter due to the electric field with a desired width and strength may be formed at a desired position to thereby guide the fish.

Figure 2:
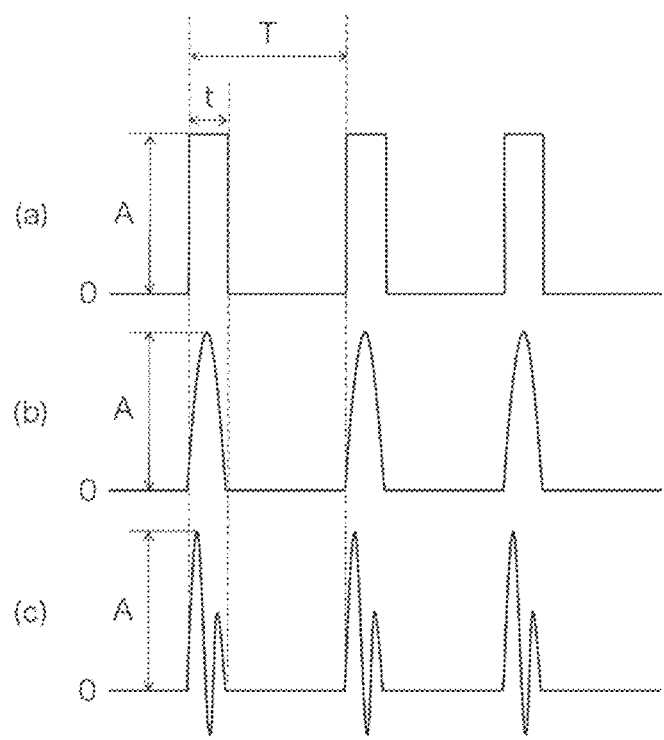
FIG. 2 is a diagram illustrating an example of an electric pulse applied to an electrode unit.

FIG. 2 is a diagram illustrating an example of an electric pulse applied to an electrode unit. For example, an electric pulse illustrated in (a), (b) or (c) in FIG. 2 is applied to at least one of the plurality of electrode units 10, in particular, to one of the two electrode units 10 adjacent to each other. (a) in FIG. 2 illustrates an example of a square wave, and (b) and (c)in FIG. 2 illustrate examples of a sine wave. Any of (a) to (c) in FIG. 2 illustrates an example in which an electric pulse having a peak value A [V] or [A] is applied for a period t [sec] within a cycle T [sec]. That is, the duty cycle in this case is D=t/T, and the frequency is 1/T [Hz]. These parameters such as peak value, duty cycle, frequency, mean voltage or mean current, and the like are adjusted to set the strength of the stimulus to the fish to be guided applied by the electric field generated by the electric pulse. These parameters are adjusted to generate suitable stimuli according to the fish to be guided, and the parameters are adjusted according to a position of the electrode unit 10 to which the electric pulse is applied; as a result, an appropriate stimulus will be applied to a target organism of a target fish. Note that (c) in FIG. 2 illustrates an example in which a sine wave applied has a peak value A that gradually decreases during the period t. With reference to (c) in FIG. 2, the maximum peak value is illustrated as a representative value of the peak value A. The peak value A may change within the period t in this manner. Even when the peak value A becomes negative, the mean voltage or the mean current is obtained from the mean value of the effective values. Note that the repeating frequency of the intermittently applied electric pulse is referred to as "cycle T", and the frequency of the voltage/current applied within one electric pulse, that is, the frequency of the sine wave in (b) and (c) of FIG. 2, for example, is called 'frequency'. Further, the voltage/current value in a period of the cycle T in which the electric pulse is not applied may be 0, or a direct current or alternating bias voltage/current may be applied. Further, weak, direct current or alternating current/voltage components may be superimposed.

The intensity of the stimulus to the fish applied by the electric pulse or the strength of the stimulus felt by the fish depends on the electrical strength such as the peak value or the mean current, but depends also on other parameters such as frequency. That is, sensitivity of fish to a stimulus has frequency dependency as well as strength dependency. Thus, in order to obtain the intensity of the desired stimulus, various parameters such as intensity, frequency, cycle, duty cycle, and the like of the electric pulse to be applied may be adjusted. Moreover, such sensitivity dependencies differ according to the size and type of fish. Thus, in considering the sensitivity dependencies of the fish to be guided, for example, the frequency dependency, if the frequency with the highest sensitivity is selected, it is possible to apply a relatively strong stimulus even with an electric pulse of relatively low intensity. If the strength of the electric pulse, for example, the voltage value or the current value is lowered, the power consumption of the whole system may be reduced. In addition, an undesirable effect, such as shock caused by voltage/current of excessive strength, or damage such as damage to skin, to muscle, to internal organs and the like, on the fish to be guided may be minimized. In addition, an adverse effect of electric corrosion or the like on the electrodes described later may be lowered. That is, it is possible to guide the fish by giving sufficient stimuli with an electric field of smaller strength by selecting the optimum parameter for the target fish, such as the optimum frequency.

The intervals between the electrode units may be determined considering the peak value to be applicable, the size of the fish to be guided, the geographical condition of the water bottom, other external conditions such as the obstruction level with respect to traffic such as a ship, and the like. The intervals between the electrode units 10 may each be a relatively long distance, such as approximately 100 m or approximately 1 km; or the intervals may each be a relatively short distance such as 50 cm or more and 10 m or less, 60 cm or more and 5 m or less, 70 cm or more and 3 m or less, 80 cm or more and 1 m or less, and the like. Further, within a water tank, the intervals may each be appropriately selected on the order of several tens of cm, such as 30 cm to 50 cm, and the like, according to the size of the water tank. Then, an electric pulse is applied to the electrode units by selecting a parameter such as the mean voltage or the mean current so as to provide a desired strength of stimulus to fish, that is, so as to generate desired electric field strength with respect to predetermined intervals between the electrode units.

Figure 3:
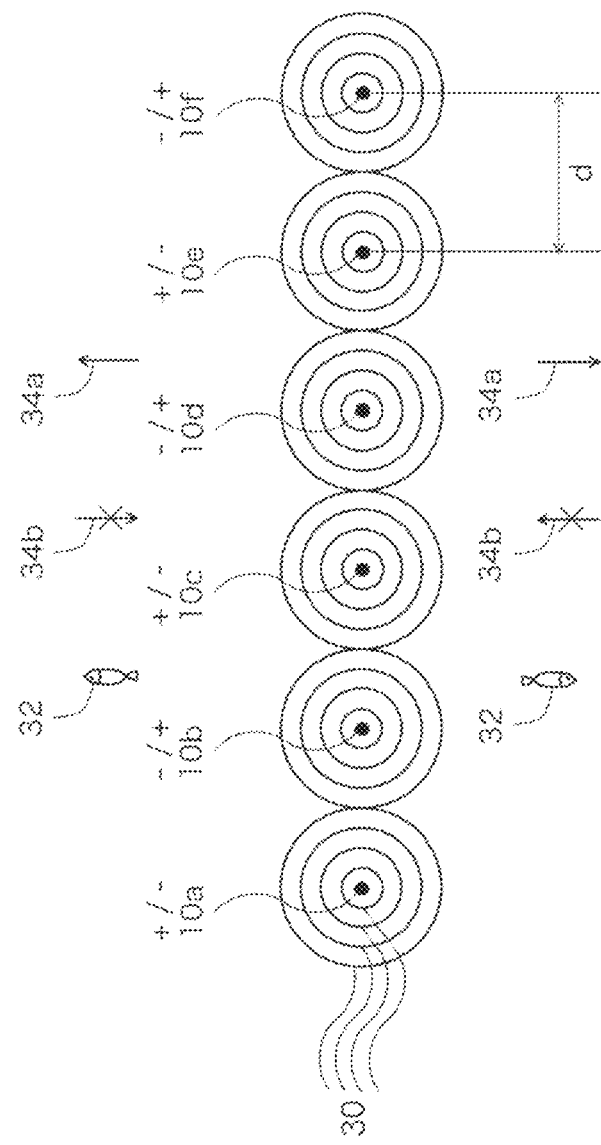
FIG. 3 is a diagram illustrating the principle of a method according to an embodiment of the present invention.

FIG. 3 is a diagram illustrating the principle of a method according to an embodiment of the present invention. FIG. 3 is an image of an electric field generated when electric pulses are applied to electrode units 10a to 10f arranged in a row at a predetermined interval d. Note that FIG. 3 depicts six electrode units 10a to 10f, however, the number of electrode units 10 is not limited to six. A large number of electrode units 10 may be disposed side by side so as to form a fish preserve area 12a, an entrance/exit area 12b, and a guide path area 12c as a whole, as illustrated in FIG. 1.

For example, according to the example of FIG. 3, in a certain cycle, electric pulses are applied to the electrode units 10a, 10c, and 10e (become + pole), and the adjacent electrode units 10b, 10d, and 10f become 0 [V] (− pole). In the next cycle, electric pulses are applied to the electrode units 10b, 10d, and 10f, and the adjacent electrode units 10a, 10c, and 10e become 0 [V]. As described above, electric pulses are applied between the adjacent electrode units 10. Note that the − pole does not necessarily have a polarity different from 0 [V] or the + pole, and may be a potential at which some potential difference occurs with the + pole. As described above, when an electric pulse is applied between adjacent electrode units by alternately reversing the polarity of the electric pulse, damage to the electrode units may be reduced by applying electricity to the electrode units in water, particularly seawater. Examples of such damage include the outflow of ions from electrode units, corrosion due to oxidation, precipitation of components contained in water, and the like, which are caused by applying electricity to the electrode units in water. Such damage may be neutralized or averaged by alternately applied electrical pulses so as not to allow damage to concentrate on a specific electrode unit between electrode units. Hence, the maintainability of the electrode units may be improved.

FIG. 3 is a schematic diagram illustrating such a case, where the intensity of the electric field generated in each cycle is schematically illustrated around the electrode units 10a to 10f in the form of equipotential lines 30. To facilitate the viewability of the figure, the equipotential lines 30 around each of the electrode units 10a to 10f represent only a partial range; however, in practice, the electric field may be wider than the partial range represented by the equipotential lines 30. That is, the electric field may extend to a neighboring electrode unit or in a range farther than the neighboring electrode units.

In FIG. 3, the equipotential lines 30 are concentrically represented so as to enclose each of the electrode units 10a to 10f. Thus, an area, in which the electrode units 10a to 10f arranged at intervals in a row are connected, is covered with the concentric equipotential lines 30. An electric field is generated by an electric pulse applied to each of the electrode units 10a to 10f in the area covered by the equipotential lines 30; that is, an electric field is generated in a whole area where the electrode units 10a to 10f are arranged in a row. The electric pulse applied to each of the electrode units 10a to 10f is set so as to generate an electric field that applies an electrical stimulus disliked by the fish 32. Thus, the fish 32 attempt to move towards weaker or no electrical stimulus. Accordingly, the fish are guided in a direction away from the electrode units 10a to 10f, that is, in the direction indicated by an arrow 34a in FIG. 3. Conversely, the closer to the electrode units 10a to 10f, the stronger the electric field becomes, and the stronger the electric stimulus becomes. Thus, the fish will not move in the direction of approaching the electrode units 10a to 10f, that is, in the direction indicted by an arrow 34b in FIG. 3. An electric field barrier is formed in this manner, and the fish will not be able to pass through intervals between the electrode units 10a to 10f.

As described above, an electric field is generated around the electrode units to which electric pulses are applied, and the electric field varies with a distance from the electrode units. The electric field becomes stronger with proximity to the electrode units, and thus the stimulus received by the fish becomes greater accordingly However, susceptibility of fish to stimuli may also have dependency on other parameters such as frequency. Note that the following description mainly addresses the intensity of the electric field for simplifying the illustration; however, intended meaning of the intensity of the electric field is the "intensity" of the stimulus to the fish applied by the electric field, rather than the physical "strength" of the electric field itself.

Note that the degree of the electric pulse-induced electric field stimulation received by the fish/the effect received by the fish, that is, the sensitivity/responsiveness of fish to electrical stimulation varies according to the type and size of the fish and/or various organs of fish, such as gills, fins, swim bladders, and the like.

Various parameters of the electric pulse such as the mean voltage, the mean current, the peak value, duty cycle, frequency, and the like are adjusted according to the type and size of the fish and/or the uniqueness of individual differences such as sensitivity of various organs to which action is applied, thereby appropriately controlling the degree and type of stimulation received by the fish.

For example, as illustrated in FIG. 1, a plurality of electrode units 10 are arranged at intervals along a substantially quadrangular outline forming the fish preserve area 12a. In this configuration, when an electric pulse as depicted in FIG. 2 is applied between the adjacent electrode units 10, an electric field, which applies electrical stimuli to fish, is generated in water as depicted in FIG. 3. As a result, it is possible to form a barrier formed by an electric field along the outline of the fish preserve area 12a through which the fish will not pass, and to guide the fish to be confined within the fish preserved area 12a.

Furthermore, among the electrode units 10a to 10f depicted in FIG. 3, any one or more of the electrode units 10c and 10d are allocated to the entrance/exit area 12b depicted in FIG. 1. The entrance/exit area 12b may be opened or closed by switching on and off of electric pulses to the electrode units 10c and 10d allocated to the entrance/ exit area 12b. For example, in FIG. 3, the areas (in FIG. 3) above the electrode units 10a to 10f are defined as a fish preserve area 12a, and the areas (in FIG. 3) below the electrode units 10a to 10f are defined as a guide path area 12c. In this case, when electric pulses are applied to the electrode units 10c and 10d allocated to the entrance/exit area 12b, an electric field is also formed at the positions of the electrode units 10c and 10d, and electric stimuli are applied to the fish attempting to pass through the electric field. As a result, fish within the fish preserve area 12a are guided so as to be trapped within the fish preserve area 12a, and fish outside the fish preserve area 12a are locked out from the fish preserve area 12a.

When the application of the electric pulses to the electrode units 10c and 10d allocated to the entrance/exit area 12b is cut off, no electric field is formed at the positions of the electrode units 10c and 10d. As a result, the entrance/exit area 12b is opened so as to allow the fish to pass through the area between the electrode units 10c and 10d. Thus, the fish may move back and forth (pass) between the fish preserve area 12a and the guide path area 12c via the entrance/exit area 12b.

When a user desires to guide the fish from the fish preserve area 12a to the guide path area 12c, the entrance/ exit area 12b is simply opened so as to allow the fish in the fish preserve area 12a to voluntarily detect the entrance/exit area 12b and move to the guide path area 12c. Alternatively, an electric pulse that applies stronger stimulation may be sequentially applied to the electrode units 10 in the order of being located farther from the entrance/exit area 12b, among the electrode units 10 forming the fish preserve area 12a. That is, as the fish move away from the fish preserve area 12a and approach the entrance/exit area 12b, an electric pulse giving strong stimulation may gradually be applied to the electrode units loser to the entrance/exit area 12b so as to guide the fish to the entrance/exit area 12b. In addition, a fish attracting unit configured to attract fish may be disposed in the vicinity of the entrance/exit area 12b or within the guide path area 12c. The fish attracting unit may be an optical element such as a fish attracting lamp (including a light emitting element such as a light bulb, an LED, or a laser) configured to emit light that attracts fish, or an electrode unit configured to generate electric stimulus that attracts fish. For example, it is possible to attract fish to the electrode units 10 by applying electricity differing from the electric pulses described above. Depending on the type of fish, sound waves and ultrasound may also be used. The fish attracting unit may be integrally attached to an electrode device (or electrode units 10); the fish attracting unit may be provided separately from the electrode device (or electrode units 10). Further, a fish driving unit may be provided alternative to, or in addition to the fish attracting unit. For example, a jet water stream may be generated by using a pump or the like to flow the fish with the water stream.

Figure 4:
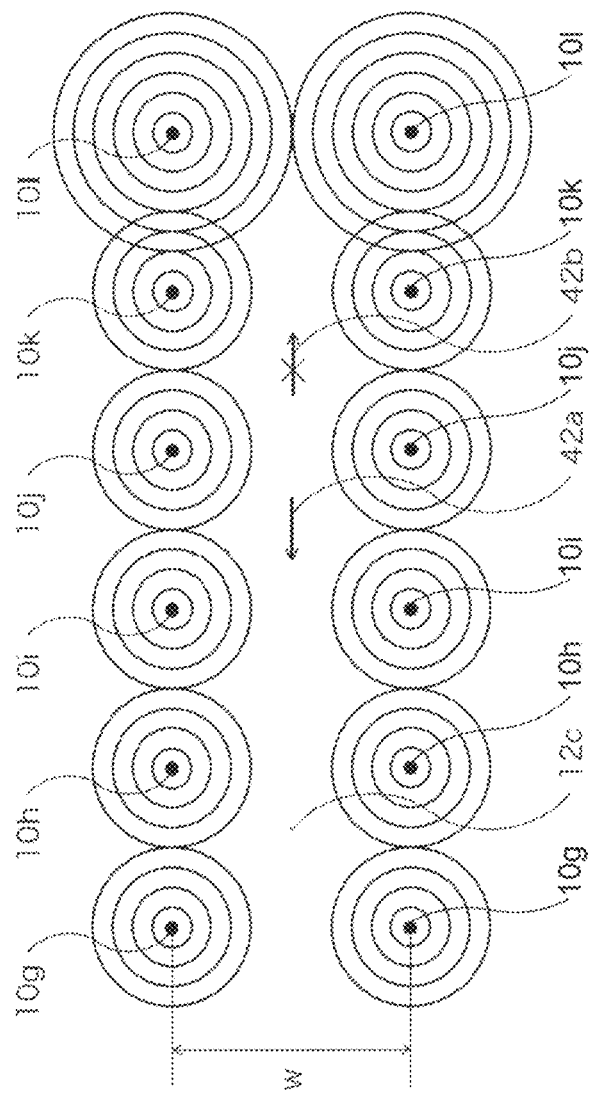
FIG. 4 is a diagram illustrating an example of an arrangement of electrode units 10 according to an embodiment of the present invention.

FIG. 4 is a diagram illustrating one embodiment of an arrangement of electrode units 10 forming a guide path area 12c, which represents an image of an electric field generated when electric pulses are applied to the electrode units 10g to 10l. In FIG. 4, two rows each having the electrode units 10g to 10l arranged at intervals in a row are arranged via a substantially constant width w. Of the electrode units 10g to 10l, electric pulses of the same strength are applied to the electrode units 10g to 10k in the same manner as the electrode units 10a to 10l depicted in FIG. 3. Thus, as described above, electric fields are formed such that the fish will pass through the respective rows formed by the electrode units 10g to 10k. Since such electric fields are formed around the respective rows of the electrode units 10g to 10k aligned via the width w, fish will not come out from an area sandwiched between these two rows of electrode units 10g to 10k, thereby forming a guide path area 12c. The fish move within the guide path area 12c mainly in the horizontal direction in FIG. 4. That is, fish within the guide path area 12c will not go out from the guide path area 12c or across either of the rows of the electrode units 10g to 10l; or fish outside the guide path area 12c will not enter the guide path area 12c.

In FIG. 4, an electric pulse stronger than the electric pulse applied to the electrode units 10g to 10k is applied to the right end electrode units 10l of the electrode units 10g to 10l of the two rows, and a strong electric field is thus formed around the electrode units 10l. The intensity of this strong electric pulse applied to the electrode units 10l is set such that the stimulus applied by the electric field formed around the electrode units 10l is sufficiently strong to prevent the fish from passing through at least anywhere between the two electrode units 10l along the width W direction. Note that in the following, such a (relatively strong) electric field and electric pulse may be simply referred to as "strong electric field" and "strong electric pulse" in some cases. Accordingly, a barrier formed by an electric field is generated at a position sandwiched between the two electrode units 10l within the guide path area 12c formed between the two rows of the electrode units 10g to 10l. Thus, within the guide path area 12c, the fish will not pass through the area sandwiched between the two electrode units 10l to which the strong electric pulse is applied. As a result, within the guide path area 12c, the fish will not move in the direction indicated by an arrow 42b, and the fish will thus be guided in the direction indicated by an arrow 42a.

In this example, an electric field capable of applying stimulation over a wider range (i.e., the entire direction across the guide path area) is formed by increasing the intensity of the electric pulses. However, other parameters may also be adjusted to generate an electric field that applies stimulation over such a wider range. That is, a value obtaining higher sensitivity of a target fish or a value of a stimulus that is likely to propagate in a wider range may be selected by changing the frequency, the pulse width, the duty cycle, and other various parameters. Hence, an electric field that gives stimulation over a wider range may be formed.

This strong electrical pulse is applied to each of the two electrode units 10l for a predetermined period and is then applied to each of the adjacent electrode units 10k. In this case, the electrical pulses applied to the electrode units 10l may maintain the same intensity as the strong electrical pulses described above, or the electrical pulses applied may be weakened to the same intensity as the other electrode units 10g to 10j. Subsequently, after a predetermined period of time elapses, an electric pulse having the same intensity as the strong electric pulse is applied to each of the adjacent electrode units 10j. As described above, strong electric pulses are sequentially applied to the adjacent electrode units along the desired moving direction according to speed at which the fish move. A barrier formed of the electric field generated by this strong electrical pulse gradually moves toward the direction in which the fish are to be guided within the guide path area 12c. As a result, the fish in the guide path area 12c move and are guided in the direction indicated by the arrow 42a in FIG. 4 so as to be gradually pushed from the barrier formed of the electric field generated by this strong electric pulse.

In addition to forming of a barrier with a strong electric pulse within the guide path area 12c so as to prevent the fish from moving in a direction opposite to the desired direction to guide the fish in the desired direction, a fish attracting unit configured to attract fish may be provided in a direction to guide the fish; that is, the fish attracting unit may be disposed ahead of the direction indicated by the arrow 42a in FIG. 4. As described above, this fish attracting unit may be formed by using various types of units alone or in combination. Further, a fish driving unit may be provided alternative to, or in addition to the fish attracting unit.

Figure 5:
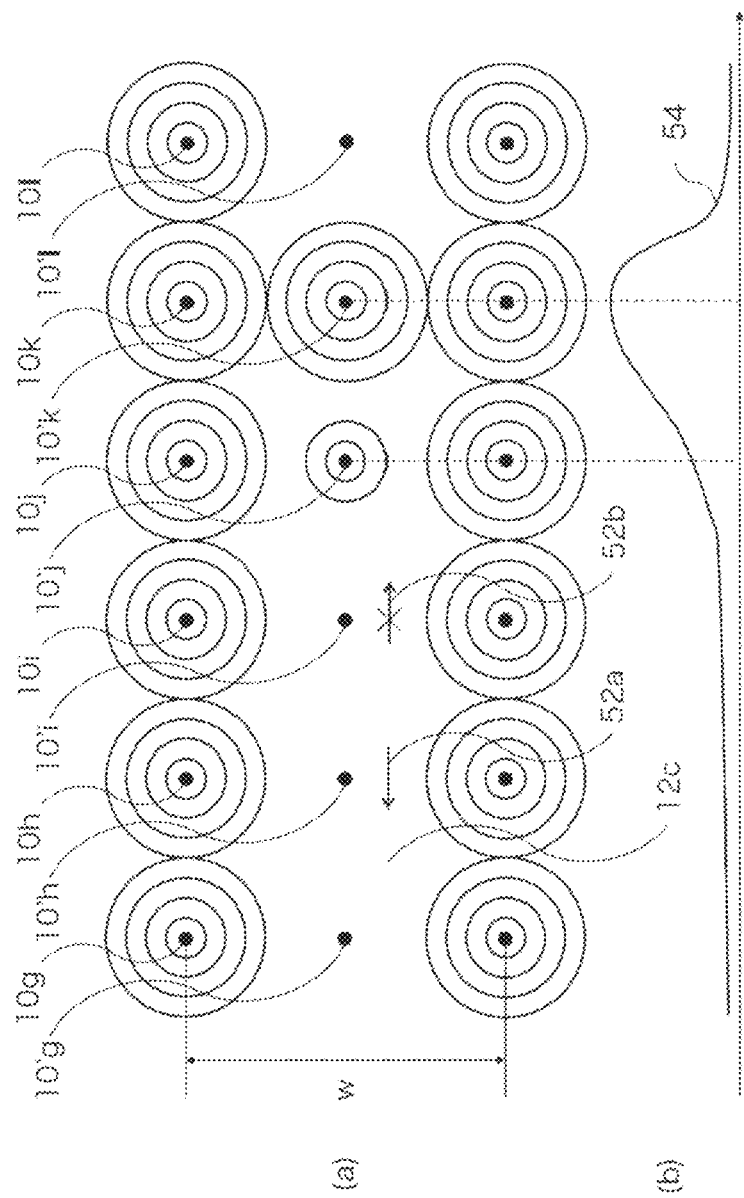
FIG. 5 is a diagram illustrating another example of an arrangement of electrode units 10.

FIG. 5 depicts another example of an arrangement of the electrode units 10 within the guide path area 12c. In FIG. 5, (a) is a diagram illustrating an arrangement of the electrode units 10 of the guide path area 12c; (b) is a diagram illustrating the intensity of the electric field generated near the center in the width direction of the guide path area 12c of (a).

In the example of FIG. 5, similar to the example depicted in FIG. 4, two rows of electrode units 10g to 10l are provided substantially parallel to each other, and a guide path area 12c is formed between the two rows. Furthermore, a row of electrode units 10'g to 10'l is provided between the two rows of electrode units 10g to 10l. In the example of FIG. 5, an electric pulse is applied to one electrode unit 10'k of the electrode units 10'g to 10'l in the middle row, and an electric field is generated around the electrode unit 10'k. An electric field generated by the two electrode units 10k and the central electrode unit 10'k forms an outline of the guide path area 12c. As a result, the electric field generated forms a barrier across the entire width W of the guide path area 12c at the position of the electrode units 10'k within the guide path area 12c. Thus, the fish within the guide path area 12c will not pass through the barrier formed by this electric field.

That is, within the guide path area 12c, the fish will not move toward the right hand side of the electrode unit 10'k. In other words, the fish will not move in the direction indicated by an arrow 52b, and the fish will be guided toward the arrow 52a as a result.

In FIG. 5, (b) illustrates a change in the electric field strength in the vicinity of the center in the width direction within the guide path area 12c. The horizontal axis of (b) in FIG. 5 corresponds to the horizontal direction of (a) in FIG. 5, and the vertical axis of (b) in FIG. 5 corresponds to the electric field intensity. A curve 54 represents the intensity of the electric field at respective positions.

Among the electrode units 10'g to 10'l in the middle row, the electric pulse as described above may be applied to the electrode unit 10'k, and electric pulses weaker than that applied to the electrode unit 10'k may be applied to the electrode units adjacent to this electrode unit 10'k; in particular, the electric pulses weaker than that applied to the electrode unit 10'k may be applied to the electrode unit 10'j immediately adjacent to this electrode units 10'k in the direction in which the fish are desired to be guided. Such a weak electric pulse will form a weak electric field around the electrode unit 10'j. Accordingly, as represented by the curve 54, the electric field in the vicinity of the center in the width direction of the guide path area 12c indicates a low value (e.g., may be 0) from the electrode units 10'g to 10'j. The electric field gradually starts rising from the electrode unit 10'i toward the electrode unit 10'j, becomes the highest at the position of the electrode unit 10'k, and starts falling from the electrode unit 10'k onward. As a result, with respect to fish on the left hand side of the electrode unit 10'k within the guide path area 12c in FIG. 5, for example, when the fish in the vicinity of the electrode unit 10'i move toward the right hand side of the figure (FIG. 5), the electric field becomes gradually stronger, and the strength of the electric stimulus received by the fish also becomes stronger. As a result, the fish themselves voluntarily move in the direction in which the stimulus applied by the electric field becomes weak, that is, in the direction indicated by the arrow 52a. Thus, at the time of approaching the electrode unit 10'j before reaching the electrode unit 10'k, the fish within the guide path area 12c start moving in the direction toward the weak electrical stimulus applied by the electric field.

As described above, when an electric pulse is applied such that the stimulation gradually weakens toward the direction in which the fish are desired to be guided, the electric stimulation becomes stronger as the fish move in a direction in which the fish are undesired to be guided. Since the fish start to voluntarily move in a direction of weaker electric stimulation, the fish will be guided more smoothly.

Further, after applying an electric pulse to the electrode unit 10'k for a predetermined period of time in a manner similar to the example described with reference to FIG. 4, an electric pulse weaker than the electric pulse that has been applied to the electrode units 10'k is applied to an adjacent electrode unit. More specifically, an electric pulse weaker than the electric pulse that has been applied to the electrode unit 10'k is applied to the adjacent electrode unit, for example, the electrode unit 10'j disposed in the direction in which the fish are desired to be guided. In this case, an electric pulse weaker than the electric pulse applied to the electrode unit 10'j is further applied to the electrode unit 10'i disposed adjacent to the electrode unit 10'j . In a manner described above, strong and weak electric pulses are sequentially applied to adjacent electrode units in the desired direction in accordance with the speed at which the fish move. As a result, a barrier formed by an electric field generated by these electric pulses gradually moves toward the direction in which the fish are desired to be guided within the guide path area 12c so as to guide the fish.

Further, after applying an electric pulse to the electrode unit 10'k for a predetermined period of time in a manner similar to the example described with reference to FIG. 4, an electric pulse the same as the electric pulse that has been applied to the electrode units 10'k is applied to an adjacent electrode unit More specifically, an electric pulse the same as the electric pulse that has been applied to the electrode unit 10'k is applied to the adjacent electrode unit, for example, the electrode unit 10'j disposed in the direction in which the fish are desired to be guided. In this case, an electric pulse weaker than the electric pulse applied to the electrode unit 10'j is further applied to the electrode unit 10'j disposed adjacent to the electrode unit 10'j. In a manner described above, strong and weak electric pulses are sequentially applied to adjacent electrode units in the desired direction in accordance with the speed at which the fish move. As a result, a barrier formed by an electric field generated by these electric pulses gradually moves toward the direction in which the fish are desired to be guided within the guide path area 12c so as to guide the fish.

As described above, in the configuration according to an embodiment, further electrode units 10'g to 10'l are provided within the guide path area 12c to form an electrical barrier within the guide path area 12c so as to guide fish. This configuration requires, as compared with the example of FIG. 4, an additional one row of electrode units within the guide path area 12c. However, as illustrated in the example of FIG. 4, there is no need to apply a strong electric pulse to the electrode units in order to form an electrical barrier.

In a case of applying an electric pulse to the electrode units 10 in water, especially, in seawater, damage to the electrode units 10 will not be avoidable due to elution of the materials of the electrode units caused by the effect of ionic conduction or the like, corrosion by oxidation, accumulation of deposits, and the like. When the intensity of the electrical pulse increases, that is, when the voltage value/current value of the applied electric pulse increases, such damage to the electrode units 10 may become greater. In such a case, according to the example illustrated in FIG. 5, it is unnecessary to apply a stronger electric pulse to the electrode units 10, which lowers the degree of damage to each of the electrode units 10.

Figure 6:
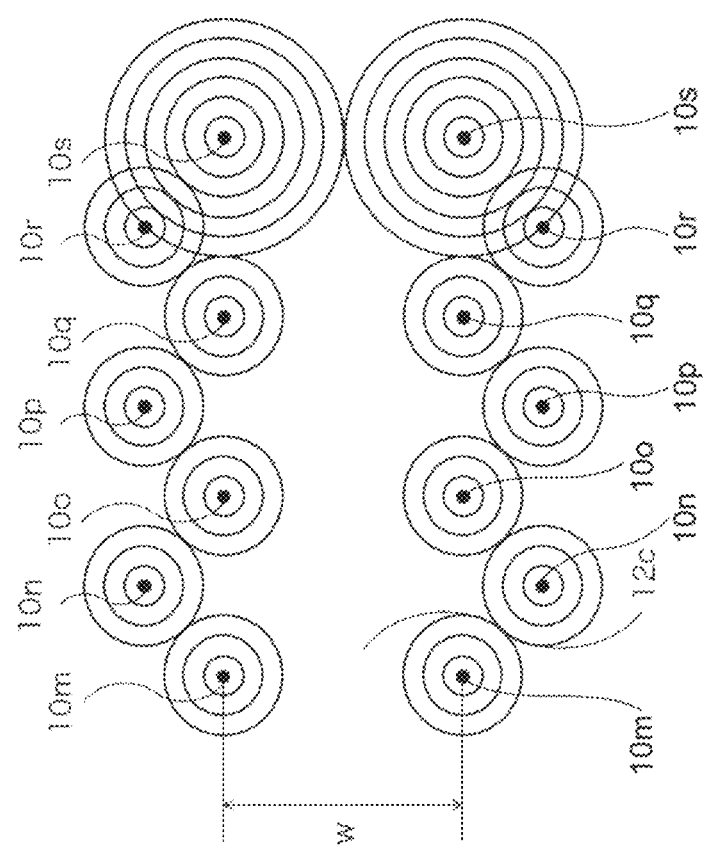
FIG. 6 is a diagram illustrating still another example of an arrangement of electrode units 10.

FIG. 6 depicts another example of an arrangement of the electrode units 10 within the guide path area 12c. In the example of FIG. 6, two rows of electrode units 10m to 10s are arranged in a zigzag pattern. Specifically, the electrode units 10m, 10o, 10q, and 10s disposed at an inner side of the guide path area 12c, and the electrode units 10n, 10p, and 10r disposed at an outer side of the guide path area 12c are alternately arranged so as to form two rows of the electrode units in respective zigzag patterns.

In the example of FIG. 6, in a manner similar to the example of FIG. 4, among these electrode units 10m to 10s, an electric pulse of the same strength is applied to the electrode units 10m to 10r, and a strong electric pulse is applied to the two electrode units 10s at the rightmost side in FIG. 6. Thereafter, this strong electric pulse is sequentially applied to the adjacent electrode units at predetermined time intervals.

Figure 7:
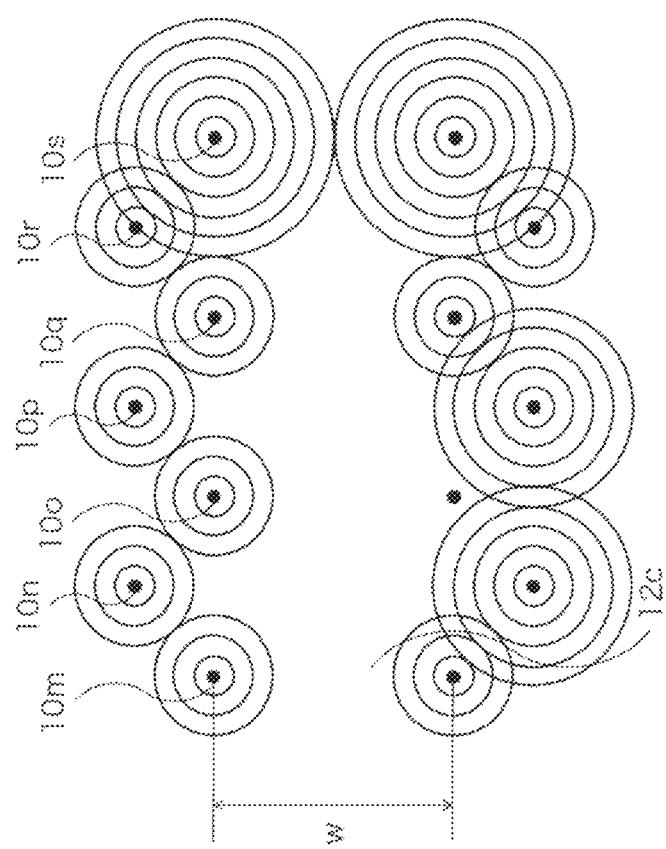
FIG. 7 is a diagram illustrating an example in a case where one of the electrode units 10 has failed.

As described above, in the configuration in which the electrode units 10m to 10s are arranged in a zigzag pattern in each row, even when one electrode unit 10o (the second electrode unit away from the leftmost electrode unit in the lower row in FIG. 6) is unable to form a predetermined electric field due to a failure or the like, the electrode units 10n and 10p adjacent to the electrode unit 10o will compensate for the failure of the electrode unit 10o, as illustrated in the example of FIG. 7 (reference numerals corresponding to the electrode units disposed in the lower row are omitted in FIG. 7, the electrode units are regarded as having the same reference numerals as the electrode units in FIG. 6). This is because when the electrode units in a row are arranged in a zigzag pattern, the distance in the longitudinal direction of the guide path area 12c, that is, the distance in the direction along the outline of the guide path area 12c is shorter with respect to the distance between the adjacent electrode units. That is, when one electrode unit 10o in a row is missing in the configuration illustrated in FIG. 6, the distance between the remaining adjacent electrode units 10n and 10p becomes shorter than the distance between the remaining adjacent electrode units when one electrode unit in a row is missing in the configurations illustrated in FIGS. 4 and 5. Thus, an electric field may be formed by the remaining electrode units 10n and 10p, so as to compensate for the electric field of the missing part due to failure or the like, thereby forming the outline of the guide path area 12c.

Figure 8:
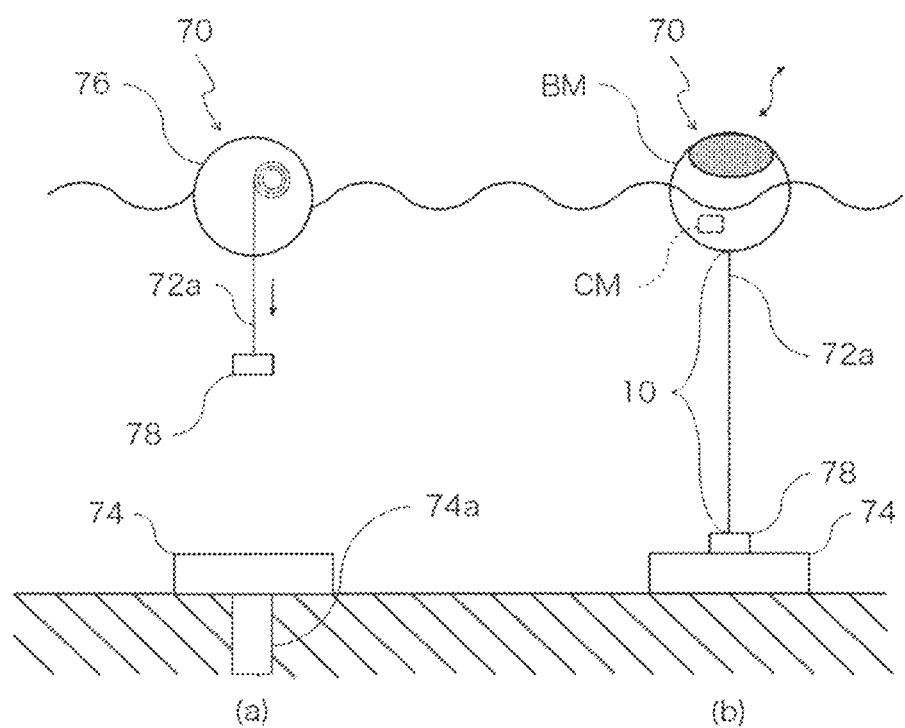
FIG. 8 is a diagram illustrating an example of an electrode device 70 according to an embodiment of the present invention.

FIG. 8 is a diagram illustrating one embodiment of an electrode device 70 including electrode units used in the present invention. In FIG. 8, (a) illustrates a process of placing an electrode device 70 at a predetermined position in water, and (b) illustrates the electrode device 70 that includes an electrode unit 10 to which an electric pulse is applied, and a fixing unit 74 configured to fix the electrode units at a desired installation position in water, where the fixing unit 74 is connected to the electrode unit 10. According to a configuration of the electrode device 70, an electric field is formed in water when an electric pulse is applied to the electrode unit 10.

The electrode unit 10 includes a linear portion 72a having a conductive and corrosion resistant surface extending at least partially from the water bottom toward the water surface, and the fixing unit 74 is provided at the lower end of the linear portion 72*a*. A float 76 configured to support the linear portion 72*a* between the float 76 and the fixing unit 74 is provided at the upper end of the linear portion 72*a*.

(a) in FIG. 8 schematically illustrates the inside of the float 76. The float 76 is a substantially spherical shell having a space inside the shell and is configured to float on the water surface. Before the electrode device 70 is installed at a predetermined position, the linear portion 72*a* is wound and housed in the float 76, and when the float 76 is positioned above the fixing unit 74, the linear portion 72*a* is unwound toward outside the float 76. For example, when the float is provided with a propulsion unit such as a propeller or a waterjet generator, and a position detector such as a GPS device, the float automatically advances to a predetermined position via the propulsion unit while detecting a position via the position detector. When reaching the target position, the float will unwind the linear portion 72*a*. In this case, a mutual position detector capable of detecting the mutual positional relationship between the fixing unit 74 and the float 76 may be provided. For example, a transmitter may be disposed on the fixing unit 74, a receiver configured to receive a signal from the transmitter may be disposed on the float, or a radar or the like may be disposed on the float A connecting portion 78 configured to detachably connect the linear portion 72*a* and the fixing unit 74 is disposed at the lower end of the linear portion 72*a* of the electrode device 70.

When the linear portion 72*a* is unwound, the connecting portion 78 provided at the lower end of the linear portion 72*a* approaches the fixing unit 74 disposed at the bottom of water. When the connecting portion 78 reaches the depth of the fixing unit 74 provided at the water bottom, the connecting portion 78 is connected to the fixing unit 74, and the electrode unit 10 is fixed at a predetermined position.

For example, the upper surface of the fixing unit 74 and the lower surface of the connecting portion 78 may be provided with threaded portions to be engaged with each other, or may be provided with magnets or the like to attract each other. In such a case, when an electromagnet is used as a magnet, the connecting portion 78 may be detachably attached to the fixing unit 74 by turning on and off the current flowing through a coil.

Thus, when the electrode unit and the fixing unit are configured to be detachable, the electrode unit may be detached from the fixing unit at the time of maintenance. Even if the electrode unit corrodes or deposits on the electrode unit reach a certain level (quantity) to cause to fail the generation of a desired electric field, the electrode unit may be detached from the fixing unit, and the detached electrode unit may be lifted from the water for maintenance. Further, another new electrode unit may be immediately connected to the fixing unit from which the electrode unit has been detached, and the electrode device may be used again immediately. According to such a configuration, for example, when replacing an electrode unit used in water, only the electrode unit may be detached while leaving the fixing unit in place and a new electrode unit may be attached to the remaining fixing unit, thereby simply placing the electrode unit in the original position.

In addition, since the electrode unit is configured so as to form an electric field in water according to its function, there is a risk of being affected by electric corrosion or the like. Thus, more frequent maintenance will be required for the electrode unit as compared with the fixing unit, and the longevity of the electrode unit has to be relatively short. In such a case, if replacement/maintenance is performed while the electrode unit and the fixing unit are connected, the fixing unit is lifted from the water in an inherently unnecessarily short cycle with respect to the fixing unit; in some cases, the fixing unit may be replaced with a new one simultaneously with the replacement of the electrode unit, which results in poor efficiency. When the electrode unit and the fixing unit are configured to be detachable, the electrode unit may be maintained and/or replaced by lifting the electrode unit from water as required while leaving the fixing unit in water, which will also improve work and cost efficiencies.

For the fixing unit being configured such that the electrode unit is fixed in water against the buoyant force applied to the fixing unit itself and to the electrode unit, a greater amount of labor may be required to lift such an electrode unit that is fixed in water. By contrast, the electrode unit may be lifted relatively easily from water; hence, when the electrode unit may be detached from the fixing unit and lifted, the labor required for lifting the electrode unit may be reduced.

The linear portion 72*a* is supported between the float 76 and the fixing unit 74 while being bridged between the float 76 and the fixing unit 74. In the above configuration, even if the linear portion 72*a* is flexible, the linear portion 72*a* may be supported in a tightened manner between the float 76 and the fixing unit 74 by the buoyancy applied to the float 76. The linear portion may be linearly held by the tension applied to the linear portion between the fixing unit and the float. When a plurality of electrode units are arranged side by side, the distance between the adjacent electrode units is maintained within a certain range by holding the linear portions of the electrode units in a straight line. Thus, it is possible to form an electric field having a constant strength across the longitudinal direction of the electrode units.

The linear portion 72*a* may be applied with a flexible braided wire pipe or wire. As the braided wire pipe or wire, a braided conductive wire made of stainless steel may be used. Further, in place of or in addition to the stainless steel wire, a braided wire made of other conductive material such as platinum, iridium, ruthenium, rhodium, titanium, copper, chromium, carbon, and/or alloys containing these may be used. It is also possible to apply a conductive polymer material composed of polyacetylene, polypyrrole, polythiophene, polyaniline or the like, or a composite material obtained by adding an inorganic and/or organic (e.g., carbon) conductive material to a polymer material. Furthermore, a wire made of a nonconductive synthetic resin may be combined. By appropriately combining these strands and selecting the ratio thereof, predetermined conductivity, corrosion resistance, flexibility and/or stretchability of the linear portion 72*a* may be ensured.

Further, the above-mentioned braided wire pipe or wire may be subjected to corrosion-resistant coating or plating. For this corrosion resistant coating, the braided wire or pipe may be coated as a whole, or the strands may be coated. When the surface of the linear portion has conductivity, the linear portion itself may function as an electrode. Thus, the electric pulse applied to the electrode units may generate an electric field in water. In addition, when the linear portion has a corrosion-resistant surface, the linear portion may be installed in water, and deterioration of the electrode units due to the installation in water or due to the application of electricity may be reduced. Further, when the electrode unit is formed in a linear shape, the structure of the electrode unit may be simplified. Hence, the shape of the electrode unit may be simplified compared with the conventional mesh structure, thereby improving the maintainability.

Further, when the linear portion includes a flexible pipe or wire, the pipe or wire has a relatively thin shape. Thus, the linear portion in water may become less susceptible to the force of water flow. Further, when the linear portion has flexibility, the linear portion may suitably transfer the received force of the water flow. In this case, it is possible to prevent the electrode units from deforming and being damaged in water or to prevent the electrode units from being displaced. In addition, when transporting the electrode units before and after placing the electrode units in water, the electrode units may be handled by being wound in a coiled wire, thereby facilitating the handling of the electrode units.

Furthermore, if the linear portion is a braided wire pipe or wire, water will pass through between the woven strands. In this case, it is possible to release the force of the water flow appropriately, as well as changing the material, thickness, combination of these, and/or braiding method and the like of the strands. Hence, it is possible to widely adjust properties such as conductivity, corrosion resistance and flexibility of the pipe or wire.

Further, the linear portion may be a straight solid conductor bar, a hollow conductor pipe, or a flexible conductor wire, which is linearly stretched and supported.

Further, at least a part of the surface of the linear portion suffices to have conductivity and corrosion resistance, and other parts of the interior and the surface of the linear portion may be nonconductors such as plastic, concrete, earth and sand, for example.

The fixing unit 74 may have a weight capable of fixing the electrode unit 10 in water or may have an anchoring portion 74a firmly fixed to the water bottom. When the fixing unit 74 is provided with the anchoring portion 74a, the electrode unit 10 may be fixed to the water bottom more firmly. Therefore, even when a large force is applied to the electrode unit such as a strong water flow force, the electrode unit will not be displaced or shifted. When the fixing unit 74 has a weight capable of fixing the electrode unit 10 in water, no construction is required for fixing the fixing unit 74 to the water bottom. The fixing unit 74 may be placed on the bottom of water without construction for fixing the fixing unit 74 to the water bottom by simply submerging the fixing unit 74 in water. As a result, the electrode unit may be easily installed in a desired position in water.

Furthermore, the electrode device 70 may be provided with a battery module BM. In FIG. 8, (b) illustrates an example in which a solar cell module is attached to the upper hemisphere of the float 76 as the battery module BM. Various types of power generation modules may be applied such as a seawater battery module, a wind power generation module, a tidal power generation module and the like to the battery module BM, in addition to the solar cell module. In addition to these power generation modules, the battery module may include a storage battery. For example, when the battery module includes a solar battery cell and a storage battery, the electric power generated during the day may be constantly stored by using the solar battery cell in the storage battery, and the electric power necessary for the electrode device may be supplied constantly through the battery module. In addition, when the battery module is provided with a tidal power generator, a wind power generator, or a plurality of power generation units of different types, electric power may be stably supplied without having a storage battery.

These power generation modules BM may be provided in each of the electrode devices 70, or one battery module BM may be provided for one pair or a number of electrode devices 70. When the power generation module BM is enabled to stably supply all the power used in the electrode unit 10, it is not necessary to provide a cable for supplying power to the electrode device 70 provided with the power generation module BM. Thus, it is possible to save time and labor for laying cables for connecting the plurality of electrode units 10 to one another and to the power source. Specifically, when a large number of electrode devices are arranged in a wide area such as the ocean, it is extremely useful to save labor of laying cables. Further, as long as one power generation module BM is provided for a pair of or a number of electrode devices 70, only some of the electrode devices 70 corresponding to one power generation module BM may be connected by wire. In such a case, the number of battery modules may be saved, compared to connecting respective battery modules to electrode devices constituting the aquaculture system one by one. In addition, since it is unnecessary to lay out electric wires over a wide range to cover all the electrode devices, laying of electric wires becomes easy. Furthermore, it is possible to use the power generation module BM as a back-up power supply in the event of emergency or failure of the power supply facility after providing a cable for feeding power to each electrode device 70.

Further, the electrode device 70 may be provided with a communication module CM for communicating with a controller for controlling electric pulses. (b) in FIG. 8 depicts an example in which a radio communication module CM is provided inside the float 76. Through this radio communication module CM, the electrode device 70 may receive from the controller a signal defining the electric pulse to be applied to the electrode unit 10. Further, it is possible to transmit, to the controller, the position information of the electrode device 70, the information indicating the state of the electrode unit 10 such as damage or corrosion of the electrode unit 10, the information on the state of connection with the fixing unit 74, and the like. The position information of the electrode device 70 may be acquired by GPS or the like or relatively precise position information of the electrode device 7 may be obtained based on the mutual positional relationship with the peripheral electrode devices 70. As described above, when the communication module CM is a radio based communication module, it is possible to save time and labor of laying out electric wires for communication of control signals between the controller and the electrode devices.

Further, the position of a moving body moving in and around the area where the plurality of electrode units 10 are provided may also be precisely obtained based on mutual positional relationship with each electrode unit 10.

Figure 9:
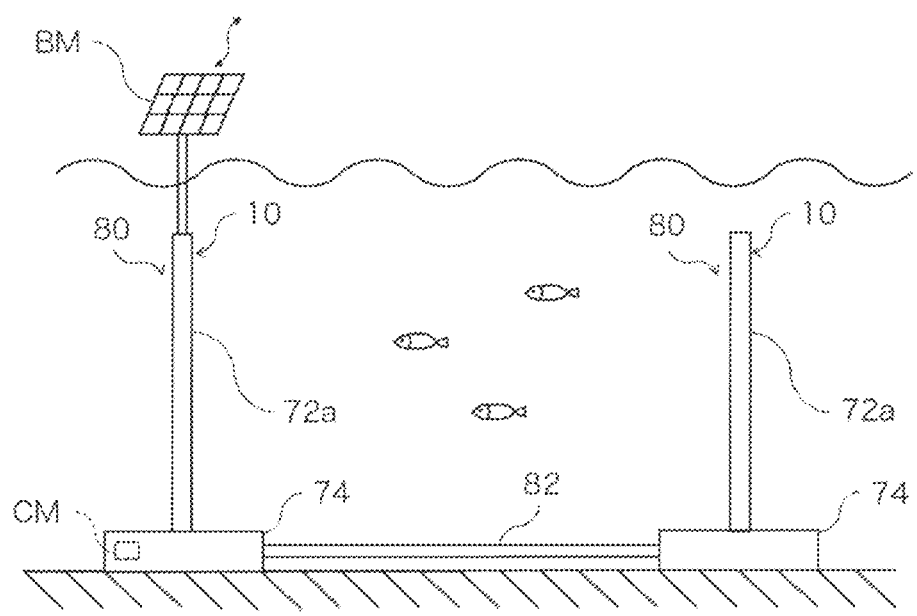
FIG. 9 is a diagram illustrating another example of an electrode device according to an embodiment of the present invention.

FIG. 9 is a diagram illustrating another example of an electrode device according to another embodiment (second embodiment) of the present invention. In FIG. 9 two examples of electrode devices 80 are illustrated. In these electrode devices 80, the linear portion 72a is directly provided as the electrode unit 10 on the upper surface of the fixing unit 74 that is provided on the water bottom. The linear portion 72a is formed by a braided wire pipe as described above. One of the electrode devices 80 is provided with a battery module BM and is connected to the other electrode device 80 via a cable 82. Thus, it is possible to supply electricity generated by one battery module to a plurality of electrode devices. Further, various signals may be communicated between the electrode devices 80 via the cable 82.

Figure 10:
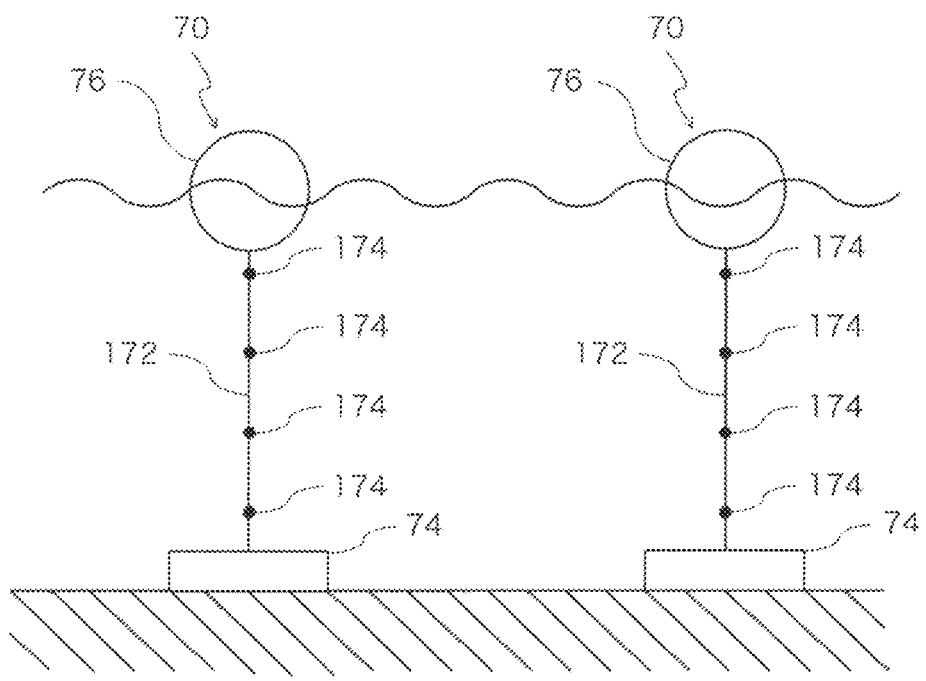
FIG. 10 is a diagram illustrating another example of the electrode device 70 according to an embodiment of the present invention.

In addition, FIG. 10 illustrates an electrode device 70 according to a further embodiment (third embodiment). The electrode device 70 according to the third embodiment differs from the electrode device 70 according to the first embodiment illustrated in FIG. 8 in that the electrode unit 10 according to the first embodiment is formed in a linear shape in FIG. 8 whereas the electrode unit according to the third embodiment is formed in a dotted shape in FIG. 10. In the first embodiment illustrated in FIG. 8, the entire linear portion 72a is substantially formed to be conductive; however; in the third embodiment, the linear portion 172 is formed to be nonconductive, and a plurality of dot-shaped electrodes 174 are attached to the nonconductive linear portion 172 while being separated from one another. In the third embodiment, these dot-shaped electrodes 174 are provided at equal intervals on the linear portion 172. The linear portion 172 is extended in the water depth direction such that the dot-shaped electrodes 174 are distributed at equal intervals in the water depth direction. Note that the intervals between the dot-shaped electrodes are not necessarily equal intervals. The dot-shaped electrodes 174 may be arranged such that the intervals near the water bottom are narrower and are gradually widened toward the water surface. Conversely, the dot-shaped electrodes 174 may be arranged such that the intervals near the water bottom are wider and are gradually narrowed toward the water surface. Wires are attached to the linear portions 172 such that electric pulses may be individually applied to the respective dot-shaped electrodes 174. Electrical pulses are selectively applied to the respective dot-shaped electrodes in response to a command from the controller 20.

Figure 11:
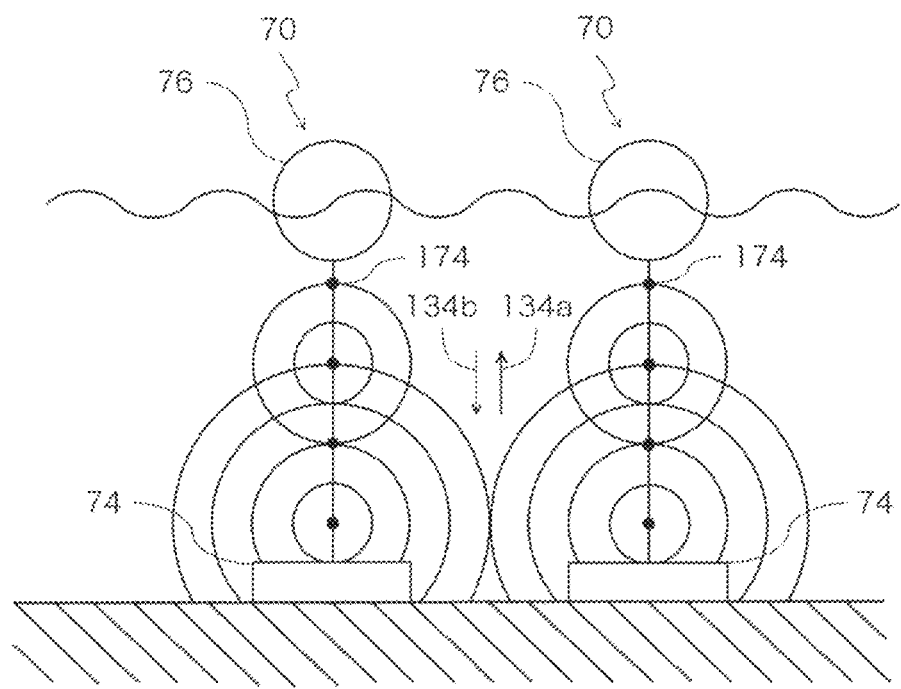
FIG. 11 is a schematic diagram illustrating an example of an electric field formed in the embodiment of FIG. 10.

In the electrode device 70 having the dot-shaped electrodes 174 distributed in the water depth direction as described above as schematically depicted in FIG. 11, when a strong electric pulse is applied to the dot-shaped electrodes 174 disposed near the water bottom and a weak electric pulse is applied to the dot-shaped electrodes disposed near the water surface, it is possible to guide fish to a water surface direction 134a; that is, it is possible to guide fish to a position at which the water depth is shallow. Conversely, when a strong electric pulse is applied to the dot-shaped electrodes 174 disposed near the water surface and a weak electric pulse is applied to the dot-shaped electrodes near the water bottom, it is possible to guide fish to a water bottom direction 134b; that is, it is possible to guide fish to a position at which the water depth is deep. Further, when an electric pulse having the same intensity is applied to each of the dot-shaped electrodes 174 disposed in one linear portion 172, a uniform electric field may be formed in the water depth direction.

As described above, when the fish are enabled to be guided not only in the water surface direction (i.e., in the horizontal direction) but also in the water depth direction (i.e., in the vertical direction), it is possible to guide cultured fish in the water surface direction so as to capture the fish, for example. Further, when the water flow near the water surface is rough or rages, it is possible to guide the cultured fish toward the water bottom. In addition, when water quality distribution occurs in the water depth direction due to some cause, it is possible to guide the fish toward a more preferable water quality depth area.

Further, when the strength, frequency, duty cycle, and the like of the electric pulse are made different according to the type and size of the fish in the horizontal direction and/or in the water depth direction, it is possible to guide the fish to a desired position for each type of fish, not only in the water surface direction but also in the water depth direction. For example, fish preserve areas may be arranged according to types of fish to partially overlap each other in the water depth direction, so as to guide necessary types of fish toward shallower direction or deeper direction according to the season, feeding time, and harvesting time.

Figure 12:
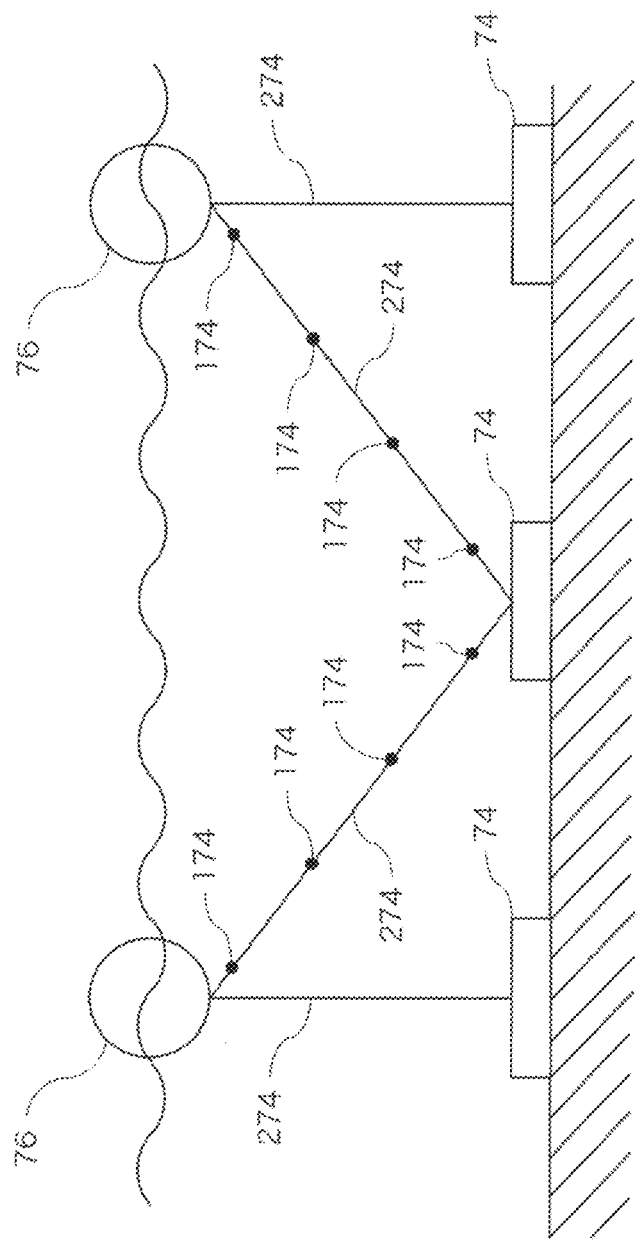
FIG. 12 is a schematic diagram illustrating another example of an electrode device according to an embodiment of the present invention.

FIG. 12 is a schematic diagram illustrating another example of an electrode device according to another embodiment (fourth embodiment) of the present invention. In the fourth embodiment, a linear portion 274 is installed inclined with respect to the vertical direction in water. More specifically, two floats 76 are arranged on the water surface, and fixing units 74 configured to fix these two floats 76 in the horizontal direction are disposed immediately beneath the two floats 76, respectively. Another fixing unit 74 is disposed between the two fixing units 74, and a linear portion 274 is bridged from each of the two floats 76 with respect to this third fixing unit 74. Dot-shaped electrodes 174 are provided at equal intervals in each linear portion 274. As a result, the dot-shaped electrodes 174 are arranged diagonally with respect to the vertical direction and radially arranged from the water bottom toward the water surface when viewed from the water surface.

Figure 13:
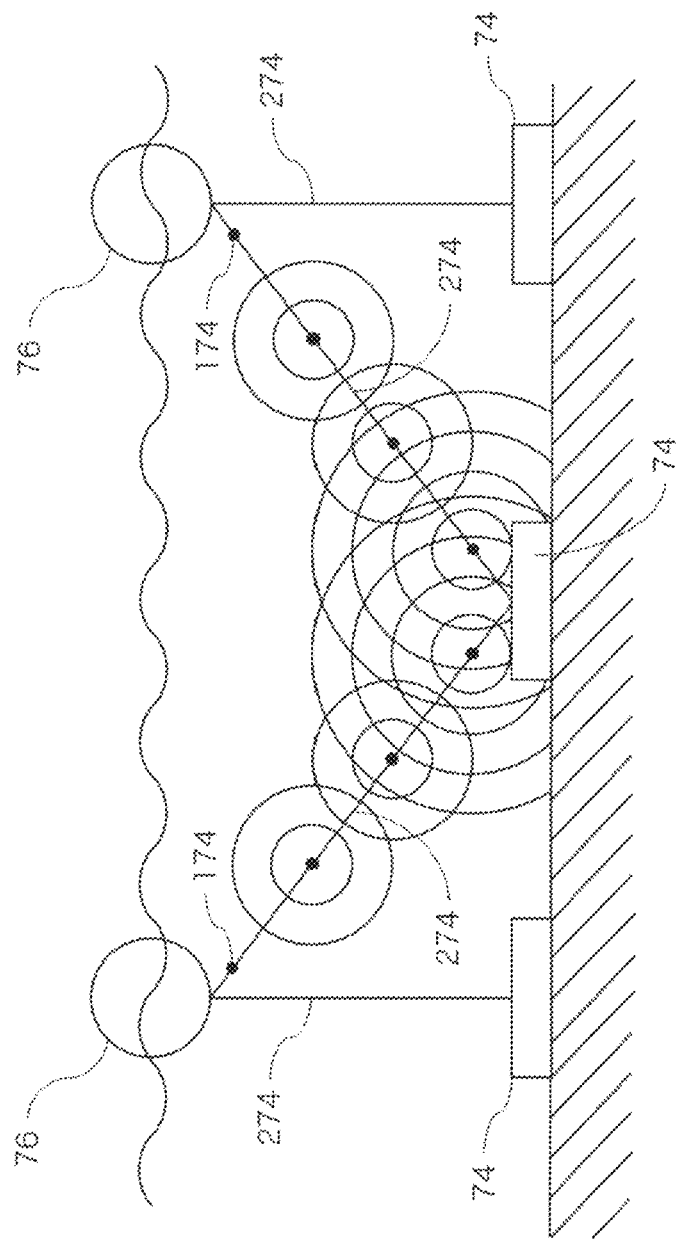
FIG. 13 is a schematic diagram illustrating an example of an electric field formed in the embodiment of FIG. 12.

When the dot-shaped electrodes 174 are arranged in this manner, even if an electric pulse of the same strength is applied to each of the dot-shaped electrodes 174, the intervals between the dot-shaped electrodes 174 near the water bottom are dose to one another, hence, the strength of the electric field near the water bottom becomes relatively strong compared to the strength of the electric field near the water surface. As a result, the fish will be guided in the water surface direction. Thereafter, as illustrated in FIG. 13, when a strong electrical pulse is applied to the dot-shaped electrodes 174 near the water bottom, the fish are further guided toward the water surface.

For example, when a plurality of electrode devices such as those illustrated as the third embodiment in FIG. 10 may be arranged in a matrix in the horizontal direction, such that the dot-shaped electrodes 174 are arranged in a three dimensional matrix form in water, and an electric pulse is applied to the dot-shaped electrodes 174 located corresponding to those illustrated as the fourth embodiment in FIG. 12, an electric field distribution similar to that in the fourth embodiment may be obtained.

Further, contrary to FIG. 10, it is also possible to narrow the intervals between the linear electrodes 174 in the vicinity of the water surface and to widen the intervals between the linear electrodes 174 in the vicinity of the water bottom. In this case, instead of adding another fixing unit 74 arranged between the adjacent fixing units 74, another float 76 may be provided between the adjacent floats 76, and the linear portion 274 may be bridged between this other float 76 and each of the fixing units 74.

In order to use a method or system according to the embodiment of the present invention, the electrode units 10 are first set so as to form a fish preserve area 12a, and a guide path area 12c configured to communicate with the fish preserve area 12a via the entrance/exit area 12b, and an electric pulse is applied to the electrode units 10.

When introducing young fish or juvenile fish to be farmed into the fish preserved area 12a, the fish are introduced into the guide path area 12c from one end portion provided on a port side of the guide path area 12c, and an electric pulse is applied to the electrode units 10 by a controller as follows. That is, an electric pulse is set and applied such that an electric field is generated to guide fish within the guide path area 12c toward the fish preserve area 12a. When the fish passing through the guide path area 12c enter the fish preserve area 12a, the controller does not apply the electric pulse to the electrode units 10 at the entrance/exit area 12b so as to open the entrance/exit area 12b. When substantially all the fish in the guide path area 12c enter the fish preserve area 12a, the controller also applies an electric pulse to the electrode units 10 at the entrance/exit area 12b so as to close the entrance/exit area 12b.

Whether the fish in the guide path area 12c have entered the fish preserve area 12a may be determined based on the detected results of the number of fish remaining in the guide path area 12c, the number of fish passing through the entrance/exit area 12b, and/or the number of fish entering the fish preserve area 12a. In order to detect the number of fish in these areas, a known fish finder or an optical detector may be used. Alternatively, the number of fish and positions of fish within the electric field may be determined by forming an electric field through the electrode units of the present invention, detecting the current flowing therein, and analyzing this current value together with the position information of the electrode units.

When fish have entered the fish preserved area 12a, fish are reared to grow for a predetermined period within the fish preserved area 12a. During the period, baits such as baitfish for aquacultured fish kept within the fish preserved area 12a may, for example, be sent from the port side to the fish preserved area 12a via the guide path area 12c.

Further, electric pulses may be applied to the electrode units to generate electric fields so as to divide the fish preserve area 12a into two or more sections. Then, aquacultured fish may be guided to a suitable one of the sections in accordance with the underwater environment such as full tide and flow, the change in water temperature due to weather, the state of bait distribution, and the like. In this case, the fish may be guided to a desired section in combination with the above-described fish collecting method and/or fish-driving method.

Once the aquacultured fish have grown to a state suitable for shipment, the aquacultured fish may be guided from the fish preserve area 12a to the vicinity of the harbor via the guide path area 12c.

Further, the method and system according to the embodiments of the present invention described above may be applied similarly to fish farmed in a water tank. That is, a fish preserve area 12a is formed in a water tank, an electric field is generated in the fish preserve area 12a, the fish preserve area 12a is divided into a plurality of sections, and desired fish are classified into desired sections according to the size of the fish or the like. Further, the method and system according to the embodiments may also be used to guide and disperse fish by using an electric field or isolate specific fish such that fish will not gather too closely at specific locations in the water tank. Further, if the water tank has a (real) entrance/exit via which fish can enter and exit, the method or system according to embodiments of the present invention may be used to guide fish towards the entrance/exit. Furthermore, if a (real) guide path is connected to the (real) entrance/exit, it is possible to guide fish within the guide path using the present method or system.

Furthermore, the aquaculture system 1 may be provided with various sensors configured to detect the water temperature, the temperature, the speed of the water flow, the density of the bait, the growing condition of the aquacultured fish, and the like. The controller may determine a type of an electric pulse to apply, and to which electrode unit 10 to apply an electric pulse of the type, based on the detected values from these sensors. Further, the controller may be preprogrammed so as to apply a predetermined electric pulse to predetermined electrode units 10 at a predetermined date and time. In such a case, individual threshold values may be set for detection values by the various sensors. Alternatively, a patterned table may be prepared in advance, and an electric pulse may be applied to each of the electrode units according to the table. Such a table may include multiple conditions to determine a type of an electrode unit 10, and a type of electrode pulse 10 suitable for the type of an electrode unit 10. In addition, a plurality of these thresholds and tables are stored according to the type of aquacultured fish, and may be retrieved and used appropriately according to the current type aquacultured fish.

Note that the present invention is not construed as being limited to the embodiments described herein, and may be applied in various modes without departing from the spirit of the present invention. For example, in the above embodiments, "fish" is used as an example of aquatic organisms, but the scope of application of the present invention is not limited to biological fish. However, the present invention is applicable to all organisms living in water including mammals such as whales, dolphins, seashells and sea lions; reptiles such as crocodiles; amphibians such as frogs; and jellyfish, squid, octopus, shrimp, algae, and the like. In addition, when trying to cultivate organisms that do not substantially move, such as shellfish and coral, the present invention may be applicable as a protective fence for keeping aquatic organisms attempting to prey on such aquaculture organisms away from the aquaculture organisms, or keeping organisms having harmful pathogenic fungi away from the aquaculture organisms.

Further, the electrode units or the electrode device may have a light emitter, such as a so-called light buoy, on or at the upper portion thereof. If such a light emitter is capable of changing color, brightness, and the like, the state of the electric pulse applied to each of the electrode units may be visually identified from the outside according to the display mode/light emission mode of the light emitter. In such a case, it is possible to instantly identify the usage state of the above-mentioned fish preserve area, entrance/exit area and/or guide path area on the spot, such as a range of the fish preserve area being used, the entrance/exit being closed, the direction of the fish being guided within the guide path area, and the like. Further, each electrode unit or electrode device may be provided with a self-diagnostic function, and the display mode/light emission mode of the light emitter may be changed according to the state of electrode unit or electrode itself, such as degree of deterioration, presence/absence of failure, type of failure, and the like of the electrode unit itself. Further, as described above, when the electrode units/electrode devices are arranged in a matrix form, it is also possible to present some message, such as an advertisement, to persons on the outside, in particular on the upper part, for example over the sky, by changing the lighting mode of the light emitters, regardless of the state of the electrode units.

In addition, if the float is configured to be visible from the water surface, the float may be used as a marker for identifying that the electrode device is installed, for a ship sailing on the water surface. Hence, it is possible to ensure both safe navigation of the ship and safety of aquacultured fish.

FIG. 14 is a diagram illustrating a procedure of a method according to an embodiment of the present invention. The following illustrates respective steps illustrated in FIG. 14.

Step S101: Allowing fish (e.g., juvenile fish) before being reared in a predetermined area (e.g., a fish preserve area) to swim and move from a first place to a predetermined area. Allowing fish to move in this manner includes, for example, allowing fish (e.g., juvenile fish) before being reared in the predetermined area (e.g., the fish preserve area) to swim and move in the water surface direction and/or the water depth direction. This step may be accomplished, for example, by applying a first external factor in the water direction and/or in the water depth direction to the fish before being reared in the predetermined area. Examples of the first external factor include, but are not limited to, an electric field, a magnetic field, a water flow having a water pressure greater than the thrust of the fish themselves before being reared in the predetermined area, a poor oxygen water mass, a change in ultrasonic wave, light, air (bubbles), water temperature, or natural enemies of fish before being reared or those imitating the natural enemies of fish before being reared (e.g., simulated bait).

Step S102: Allowing fish serving as baits to swim and move from a second place to the predetermined area for the fish being reared in the predetermined area. Allowing fish to move in this manner includes, for example, allowing fish before being reared in the predetermined area to swim and move in the water surface direction and/or the water depth direction. This step may be accomplished, for example, by applying a second external factor in the water direction and/or in the water depth direction to the fish serving as baits. Similarly to the first external factor, examples of the second external factor include, but are not limited to, an electric field, a magnetic field, a water flow having a water pressure greater than the thrust of the fish serving as baits, a poor oxygen water mass, a change in ultrasonic wave, light, air (bubble), water temperature, or natural enemies of the fish serving as baits or those imitating the natural enemies of fish before being reared (e.g., simulated bait).

Step S103: Allowing fish (e.g., adult fish) that have been reared in the predetermined area to swim and move from the predetermined area to a third place. Allowing fish to move in this manner includes, for example, allowing fish (e.g., adult fish) after being reared in the predetermined area to swim and move in the water surface direction and/or the water depth direction. This step may be accomplished, for example, by applying a third external factor in the water direction and/or in the water depth direction to the fish after being reared in the predetermined area. Similarly to the first external factor and the second external factor, examples of the first external factor include, but are not limited to, an electric field, a magnetic field, a water flow having a water pressure greater than the thrust of the fish themselves after being reared in the predetermined area, a poor oxygen water mass, a change in ultrasonic wave, light, air (bubbles), water temperature, or natural enemies of fish before being reared or those imitating the natural enemies of fish after being reared (e.g., simulated bait). Note that the fish reared in the predetermined area are not limited to fish grown to adult fish. The fish after being reared in the predetermined area may be fish during a process of growing into adult fish.

After step S103, fish after being reared in the predetermined area are captured in the third place. Such capturing of the fish is conducted manually or by using a machine. Note that this capturing of the fish may be carried out in water near the water surface, in the vicinity of the water bottom, at an intermediate depth between the water surface and the water bottom, and the like. Further, a method for capturing fish after being reared in the predetermined area is not particularly specified. For example, fish may be captured continuously using the third external factor or fish may be captured using a net.

Alternatively, such capturing of the fish may be conducted as follows: first, allowing the fish after being reared in the predetermined area to swim and move to the third place in water, subsequently, allowing the fish after being reared in the predetermined area to swim and move to a fourth place near the water surface differing from the third place in water, and then, capturing of the fish is conducted in the fourth place near the water surface. Note that the fourth place is near the water surface where the latitude and the longitude are substantially equal to the third place in water and only the water depth is different. In other words, immediately before the capturing of the fish, the fish reared in the predetermined area may be allowed to swim and move from the third place in water to the fourth place near the water surface only in the water depth direction. This method is suitable, for example, for farming fish (e.g., salmon) which prefer low temperature. This is because the quality of the fish that prefer low temperature drops as the water temperature rises; hence, the fish that prefer low temperature are required to be captured and landed before the water temperature rises.

In the predetermined area, a water depth level, at which fish after being reared are allowed to swim and move from the predetermined area to the third place, may differ from a water depth level, at which fish before being reared in the predetermined area are allowed to swim and move from the first place to the predetermined area. This method may be suitable for farming flounder, for example. This is because juvenile flounder has the property of swimming at a water depth level near the water surface, whereas adult flounder has the property of swimming at a water depth level near the water bottom.

Note that at least two of the first place, the second place, and the third place may be the same place. For example, only the first place and the second place may be a port (e.g., a port 16 depicted in FIG. 1 to be described later), or the first place, the second place, and the third place may all be ports (e.g., port 16 depicted in FIG. 1 described later). For example, if the first place and the second place are the same place, a route through which the fish before being reared in the predetermined area swim and move and a route through which the bait fish swim and move may be exactly the same; or at least a part of these routes may be overlapped or completely different. In this case, the fish before being reared and the fish serving as the baits in the predetermined area may be allowed to swim and move from the first place (or the second place) to the predetermined area at the same time. Likewise, if the first place and the third place are the same place, a route through which the fish before being reared in the predetermined area swim and move and a route through which the fish after being reared in the predetermined area swim and move may be exactly the same; or at least a part of these routes may be overlapped or completely different. Further, if the second place and the third place are the same place, a route through which the bait fish swim and move and a route through which the fish after being reared in the predetermined area swim and move may be exactly the same; or at least a part of these routes may be overlapped or completely different.

In addition, the first external factor, the second external factor, and the third external factor may all be the same, and at least one of them may be different. The first external factor is applied to the fish by a first external factor application unit. The second external factor is applied to the fish by a second external factor application unit. The third external factor is applied to the fish by a third external factor application unit. Note that the first external factor application unit, the second external factor application unit and the third external factor application unit may be constituted by a single unit, or at least one of these units may be constituted by a separate unit. For example, the first external factor application unit, the second external factor application unit, and the third external factor application unit may be constituted by a single unit, that is, the controller 20 depicted in FIG. 1.

The effect on the fish before being reared in the predetermined area by the application of the first external factor may be made smaller toward the direction in which the fish before being reared in the predetermined area are to be moved. This makes it possible to guide the fish in a direction in which the effect provided by the first external factor is smaller. Thus, it is possible for a user to enable the fish to swim and move smoothly in the direction in which the user intends to move the fish. Further, when a user desires to change the direction in which the user intends to move the fish, due to sudden change in the weather while the fish are moving, it is possible to change a fish traveling direction by increasing such an effect ahead of the fish traveling direction. For example, as described above, in a case where the external factor is at least one of an electric field generated by applying a voltage to a plurality of electrode units and a magnetic field generated by a current flowing through the plurality of electrode units, and two rows of electrode units 10g to 10l arranged in a line at intervals are arranged in parallel as depicted in FIG. 4, the direction in which the user desires to move the fish may be changed from the direction indicated by the arrow 42a to the direction indicated by the arrow 42b by increasing the voltage applied to the electrode units 10g and then weakening the voltage applied to the electrode units 10l to the same level as the electrode units 10i and the like.

Likewise, the effect on the bait fish due to the second external factor being provided and the effect on the fish after being reared in the predetermined area due to the third external factor being provided may be made smaller towards the direction in which the user desires to move these fish. This also makes it possible to guide the fish in a direction in which the effects provided by the second external factor and the third external factor are smaller. Thus, it is possible for a user to enable the fish to swim and move smoothly in the direction the user intends to move the fish.

For example, upon capturing of the fish after being reared in the predetermined area, the fish after being reared in the predetermined area may be made to swim and move from the water bottom toward the water surface by decreasing the magnitude of the effect on the fish reared in the predetermined area provided by the third external factor from the water bottom to the water surface. As a result, the fish after being reared in the predetermined area will gather on the water surface. Accordingly, it is possible for the user to more easily capture the fish after being reared in the predetermined area as compared with the ordinary capturing work of capturing in water and landing the fish after being reared in the predetermined area. Further, the fish may be made to swim and move from the water surface to the water bottom by decreasing the magnitude of the effect due to the application of external factors from the water surface to the water bottom, for example, during the moving of the fish in steps S101 to S103. As a result, when harmful substances or obstacles float on the water surface, these harmful substances or obstacles may be moved while avoiding the water surface.

In the embodiment illustrated in FIG. 14, the method of farming fish that includes all the steps S101 to S103 is illustrated as an example; however, the present invention is not limited to this example. The method of farming fish according to the present invention may be identified as a method including at least one of steps S101 to S103. That is, the method including any one of steps S101 to S103, the method including any two of steps S101 to S103, and the method including all steps of steps S101 to S103 are all within the scope of the method of farming fish according to the present invention.

For example, in the case where there is no need to place fish (e.g., juvenile fish) before being reared in the prescribed area in the predetermined area, due to fish eggs having hatched in a predetermined area (e.g., a fish preserve area), step S101 may be omitted. Alternatively, instead of step S101, the fish (e.g., juvenile fish) before being reared in the predetermined area may be transported from the first place to the predetermined area by ship.

For example, in a case where there is no need to place baits to the predetermined area due to abundant baits such as plankton inhabiting a predetermined area (e.g., a fish preserve area), step S102 may be omitted. Alternatively, instead of step S102, fish serving as baits for the fish during being reared in the predetermined area may be transported from the second place to the predetermined area by ship.

For example, instead of step S103, the fish after being reared in a predetermined area (e.g., a fish preserve area) may be captured in the predetermined area and the captured fish may be transported by ship from the predetermined area to the third area.

The following illustrates, an example of an external factor, an embodiment using an electric field generated by applying a voltage to a plurality of electrode units. However, as mentioned above, an external factor is not limited to such an electric field. Even when the external factor is other than the electric field, it is possible for the external factor application unit to make the fish to swim and move by giving the external factor to the fish in a manner similar to the case where the external factor is the electric field. In the above embodiment, the magnetic field is not explicitly stated; however, when making the fish swim and move, the fish may be made to swim and move by the magnetic field generated by a current flowing through the plurality of electrode units, in addition to or in place of the electric field generated by applying a voltage to a plurality of electrode units. That is, the fish may be made to swim and move by at least one of an electric field generated by applying a voltage to a plurality of electrode units and a magnetic field generated by a current flowing through the plurality of electrode units. When stimulating and guiding the fish by a magnetic field, as in the above-described embodiment, it is possible to adjust the magnetic field generated in water by adjusting the voltage applied to the electrode units, that is, a current parameter. In addition, since it is not necessary for the electrode units to directly contact water, and it is sufficient for the electrode units to function as a current path, the electrode units may be covered with a waterproof coating or the like. As a result, damage to the electrode units may be remarkably reduced.

In the following, a further embodiment of the present invention, particularly an embodiment in which the present invention is applied to a water tank, will be described with reference to FIG. 15.

In a water tank 100, a large number of pillar-shaped electrodes 110 are substantially arranged in parallel to one another and arranged in a matrix. The electrodes 110 may each be, for example, a cylindrical or cylindrical columnar body, or may have a prismatic shape such as a quadrangular prism. The electrodes 110 may also each be an electrode 110 of a thinner wire like linear object. Locating members 120 are disposed on upper and lower portions of the electrodes 110, so as to support and locate upper and lower ends of the electrodes 110. As illustrated in the embodiment shown in FIG. 1, a controller, though not illustrated in FIG. 15, is also provided in this embodiment The controller selects one or more electrodes 110 from the plurality of electrodes 110 and performs control so as to apply electric pulses to the electrodes. First, an illustration is given of an embodiment in which the electrode 110 has a relatively large thickness and rigidity to the extent that the electrode 110 stands by itself.

Each locating member 120 has an insulating plate 124 provided with a large number of fitting portions 122 each having a profile corresponding to the cross-sectional profile of the end portion of the electrode 110. The locating members 120 are disposed on the upper and lower portions of the electrodes 110. The end portions of the electrodes 110 are fit into the fitting portions 122 of each locating member 120 so as to locate and fix the electrodes 110 at least laterally relative to each locating member 120. These fitting portions 122 may be formed to penetrate the insulating plate 124 or may be formed as recesses not penetrating through the insulating plate 124.

The insulating plate 124 and each electrode 110, which are fixed integrally in advance, may be disposed in water, or the insulating plate 124 and each electrode 110 may be installed while being assembled in the water tank 100. In the assembling approach, the lower insulating plate 124 may first installed in the water tank first, and the upper insulating plate 124 may be subsequently installed in the water tank. Then, the electrodes 110 are inserted into through-hole shaped fitting portions 122 of the upper insulating plate 124 to penetrate through the upper insulating plate 124 toward a lower side, and tips of the electrodes 110 may be fitted into the fitting portions 122 of the lower insulating plate 124 to thereby locate the electrodes 110 in the water tank 100.

A fixing member configured to fix the upper or lower insulating plate 124 may be disposed inside the water tank 100 or a fixing member configured to fix the upper or lower insulating plate 124 to an inner wall surface of the water tank 100 may be disposed outside of the insulating plate 124. For example, the fixing member disposed inside of the water tank may be a placing piece or a placing frame that bulges inward from a wall surface of the water tank, and an outer peripheral end portion of the insulating plate 124 may be placed on such a placing piece or placing frame, thereby locating the insulating plate 124 at a predetermined position inside the water tank 100. A protrusion configured to engage with the inner wall surface of the water tank may be additionally or alternatively provided on an outer side of the insulating plate 124. The upper or lower insulating plate may also be secured to the inner wall, the bottom, or in some cases a lid of the water tank using screwing, gluing, magnets, friction and the like.

Further, a spacer member may be provided between the upper and lower insulating plates 124 to fix the upper and lower insulating plates 124 to each other at a predetermined interval.

Moreover, only the lower insulating plate 124 may be fixed at a predetermined position in the vicinity of the bottom of the water tank, and the upper insulating plate 124, which is guided via the electrodes inserted through the fitting portion 122 of the upper insulating plate 124, may be configured to be movable along a vertical direction in the vicinity of the water surface in the water tank. In this case, the upper insulating plate may be configured to receive desired buoyancy from the water in the water tank by adjusting its density, such as being formed from a hollow or foamed material.

The following illustrates another embodiment by giving an example where the electrode 110 is formed as a relatively thin linear member such as a wire.

This embodiment differs from the previous embodiments mainly in the method of fixing the insulating plates 124 and the electrodes 110. The features common to/relative to those in each of the other embodiments may be applied as they are and illustration thereof may be omitted from the specification.

In this case, the end portions of the electrodes 110 may be assembled in a fixed manner such that the end portions of the electrodes 110 are embedded in the respective fitting portions 122 of the upper insulating plate 124 and/or the lower insulating plate 124.

For example, the lower end portions of the electrodes 110 are located by being embedded and fixed to the fitting portions 122 of the lower insulating plate 124, and the upper end portions of the electrodes 110 are located by being inserted in the fitting portions 122 of the upper insulating plate 124.

The outer profile of the insulating plate 124 may be formed to substantially conform to the shape of the inner profile of the water tank 100 with a predetermined clearance, or may be formed to have any shape such as a polygon or a circle. The insulating plate 124 may have at least an outer profile smaller than the inner profile of the water tank 100 to be used.

The wiring for supplying an electric pulse to each electrode 110 may be assembled to the insulating plates 124 or each electrode 110. The wiring may preferably be detachably connected to a connection portion provided at the upper end portion of each electrode 110 via a waterproof connector, or may be connected by soldering or the like in a fixed manner and being subjected to waterproof treatment. The wiring may be inductively connected in a noncontact manner or the like.

The electric pulses applied to the electrodes 110 are the same as those in the above-described embodiments. For example, the fish in the water tank may be guided in a desired direction by sequentially applying electric pulses of various frequency ranges such as several Hz to several GHz, several Hz to several MHz, 10 Hz to 100 kHz, 100 Hz to 10 kHz, 1 kHz to 10 kHz, and the like to respective electrodes in various voltage ranges such as several V to several kV, several V to several hundred V, 5 V to 50 V, and 10 V to 30 V.

In addition, the electrodes 110 may be disposed at a position along the inner wall surface of the water tank. In this case, the electrodes 110 may be attached via fixing members provided on the upper side and the lower side of the inner wall surface of the water tank, respectively, or the electrode 110 may be attached to the inner wall surface of the water tank by adhesion or the like. In addition, groove-shaped recesses may be formed on the inner wall surface of the water tank such that the electrodes 110 may be inserted into the recesses on the inner wall surface of the water tank.

The fish in the water tank may be guided in a desired direction by applying an electric pulse using such an electrode device. Water to be supplied in the water tank may be seawater or fresh water. The water to be placed in the water tank may also be artificially produced seawater. Such an electrode device may be applied to any water tank for business use or personal use, and may be applied to any water tank for ornamental use, amusement, aquaculture, and storage.

For example, a predetermined direction at a predetermined time for guiding fish may be set in advance such that the fish may be moved in the predetermined direction at the predetermined time. Further, the water tank may be used in combination with a human sensor or the like such that the fish may be guided according to the movement of a person outside the water tank. Further, a lighting device such as illumination may be provided inside and/or outside the water tank, such that the lighting device may be turned on and off to guide the fish while exerting a production effect on viewers.

For example, if the water tank used is an ornamental water tank at an aquarium, the fish may be guided toward a position that is easy for a person to see according to position of the person viewing fish outside the water tank, such as whether the person is looking through the water tank from the side of the water tank, or from the upper or lower side of the water tank. In addition, when different types of fish are placed in the same water tank, it is also possible to determine a location for each fish type to guide the fish so as not to mix different types of fish. In this case, it is possible to partition a space to allow the fish to voluntarily move in the water tank without separating the space itself. As a result, water quality management and the like may be performed integrally in the water tank, and the management of the environment in the water tank may be performed efficiently.

In addition, when a desired work such as cleaning of the water tank is required, the fish may be guided to a predetermined area in advance so as to perform the cleaning work in the area without the fish. In such a case, after guiding the fish using the device or method according to the present invention, the water is physically blocked by another unit between the area where the fish has been guided and another area, and water may be discharged (drained) from only one area.

With such a configuration, it is possible to guide fish without touching fish with a stick, net or the like.

Although the present invention has been described based on the embodiments, the present invention is not limited to the above-described embodiments, and various modifications may be made within the scope described in the claims.

The present application is based on and claims priorities to Japanese Patent Application No. 2016-128131 filed on Jun. 10, 2016, Japanese Patent Application No. 2016-166353 filed on Aug. 26, 2016, and Japanese Patent Application No. 2016-207470 filed on Oct. 24, 2016, the entire contents of which are hereby incorporated by reference.

What is claimed is:

1. A method for guiding aquatic organisms without the need of a net, the method comprising:
disposing a plurality of electrode units at a distance from one another in water;
applying an electrical pulse to at least one electrode unit of the plurality of electrode units to generate at least one of an electric field or a magnetic field around the at least one electrode unit operable to stimulate aquatic organisms;
stimulating the aquatic organisms with the generated at least one electric field or magnetic field to guide the aquatic organisms, the guiding comprising forming a first area and a second area using the generated at least one electric field or magnetic field,
wherein forming the first area comprises placing the plurality of electrode units spaced from each other creating a perimeter,
wherein the perimeter of the first area is a closed perimeter when applying an electric pulse to at least one of the plurality of electrode units in the perimeter,
wherein said closed perimeter creates an aquatic organism preserve that locks the aquatic organism within the closed perimeter and prevents aquatic organisms from entering from outside the close perimeter,
wherein forming the second area comprises placing the plurality of electrode units in an array creating an aquatic organism guide path boundary that intersects with the perimeter of the first area; and
controlling at least one electrode unit in the perimeter of the first area to operate as an entrance/exit point in and out of the first area at the intersection, such that the first area communicates with the second area, wherein controlling the electric pulse at the entrance/exit point allows the aquatic organisms to move selectively from the first area to the second area and from the second area to the first area, and wherein controlling at least one of the plurality of electrode units in the guide path boundary prevents aquatic organisms from entering or exiting through the length of the guide path boundary,
wherein parameters of the electric pulse are selected in consideration of a sensitivity of the aquatic organisms to a stimulus applied to the aquatic organisms by the generated at least one electric field or magnetic field.

2. The method according to claim 1, wherein the stimulating of the aquatic organisms includes stimulating in a manner so as to restrict a moving direction of the aquatic organisms to cause the aquatic organisms to at least one of stay in a desired area of the first area or the second area or move in a desired direction.

3. The method according to claim 1, further comprising:
applying the electric pulse such that an intensity of a stimulus to the aquatic organisms applied by the generated at least one electric field or magnetic field decreases toward a direction in which the aquatic organisms are to be guided.

4. The method according to claim 1, further comprising:
setting an intensity of a stimulus to the aquatic organisms applied by the generated at least one electric field or magnetic field by adjusting at least one of a peak value, a duty cycle, and a frequency of the electric pulse.

5. The method according to claim 1, further comprising:
guiding the aquatic organisms within the guide path boundary to at least one of approach the aquatic organism preserve or to move away from the aquatic organism preserve.

6. The method according to claim 1, further comprising:
guiding the aquatic organisms within the guide path boundary in a first direction at a first water depth level; and
guiding the aquatic organisms within the guide path boundary in a second direction differing from the first direction at a second water depth level differing from the first water depth level. fixing portion fixed to a water bottom.

* * * * *